(12) United States Patent
Jacobson

(10) Patent No.: US 7,172,714 B2
(45) Date of Patent: *Feb. 6, 2007

(54) USE OF STATE-CHANGE MATERIALS IN REFORMABLE SHAPES, TEMPLATES OR TOOLING

(75) Inventor: Theodore L. Jacobson, Pacifica, CA (US)

(73) Assignee: 2Phase Technologies, Inc., Santa Clara, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 10/824,333

(22) Filed: Apr. 13, 2004

(65) Prior Publication Data

US 2005/0035477 A1    Feb. 17, 2005

Related U.S. Application Data

(63) Continuation of application No. 10/150,747, filed on May 17, 2002, now Pat. No. 6,780,352, which is a continuation-in-part of application No. 09/478,956, filed on Jan. 7, 2000, now Pat. No. 6,398,992.

(60) Provisional application No. 60/115,472, filed on Jan. 11, 1999.

(51) Int. Cl.
*B29C 33/40* (2006.01)
(52) U.S. Cl. ............ 264/37.1; 264/108; 264/220
(58) Field of Classification Search ........... 264/37.1, 264/37.18, 86, 108, 109, 219, 220, 221, 225, 264/226, 227; 164/1, 6, 15, 37, 520; 249/117, 249/155, 156; 425/84, 85; 297/452.41
See application file for complete search history.

(56) References Cited

U.S. PATENT DOCUMENTS

| 2,517,902 | A | | 8/1950 | Luebkeman |
| 3,136,831 | A | | 6/1964 | Zinn |
| 3,608,961 | A | | 9/1971 | Von Heck |
| 3,962,395 | A | | 6/1976 | Hagglund |
| 4,013,461 | A | * | 3/1977 | Elbert ............. 419/35 |
| 4,126,659 | A | | 11/1978 | Blad |
| 4,327,046 | A | | 4/1982 | Davis et al. |
| 4,885,811 | A | | 12/1989 | Hayes |
| 4,931,241 | A | | 6/1990 | Freitag |
| 4,952,190 | A | | 8/1990 | Tarnoff et al. |
| 5,093,138 | A | | 3/1992 | Drew et al. |
| 5,094,875 | A | | 3/1992 | Chen |

(Continued)

*Primary Examiner*—Kevin P. Kerns
(74) *Attorney, Agent, or Firm*—Townsend and Townsend and Crew LLP

(57) ABSTRACT

Techniques for generating a stable, force-resisting positive or negative representation of a shape. A state-changeable mixture includes uniform, generally ordered, closely-spaced solid bodies and a liquid carrier medium, with the liquid filling any voids or interstices between the bodies and excluding air or gas bubbles from the mixture. Within the mixture, the solid bodies can be caused to transition from a near-liquid or fluent condition of mobility to a stable, force-resisting condition. To create mobility, a small excess quantity or transition liquid is introduced to create a fluent condition by providing a slight clearance between the bodies which permits the gently-forced introduction of at least two simultaneous slip planes between ordered bulk masses of the bodies at any point in the mixture. Transition to the stable condition is caused by extraction of the transition liquid, removing the clearance between bodies and causing them to make stable, consolidated contact.

20 Claims, 8 Drawing Sheets

U.S. PATENT DOCUMENTS

| | | |
|---|---|---|
| 5,198,167 A | 3/1993 | Ohta et al. |
| 5,262,121 A | 11/1993 | Goodno |
| 5,348,070 A | 9/1994 | Fischer et al. |
| 5,374,388 A | 12/1994 | Frailey |
| 5,556,169 A | 9/1996 | Parrish et al. |
| 5,626,657 A | 5/1997 | Pearce |
| 5,881,409 A | 3/1999 | Pearce |
| 5,928,597 A | 7/1999 | Van Ert |
| 5,957,189 A | 9/1999 | Uzaki et al. |
| 5,966,763 A | 10/1999 | Thomas et al. |
| 5,971,742 A | 10/1999 | McCollum et al. |
| 6,224,808 B1 | 5/2001 | Essinger et al. |
| 6,398,992 B1 * | 6/2002 | Jacobson ............... 264/37.1 |
| 6,398,998 B1 | 6/2002 | Krenchel et al. |
| 6,780,352 B2 * | 8/2004 | Jacobson ............... 264/37.1 |

* cited by examiner

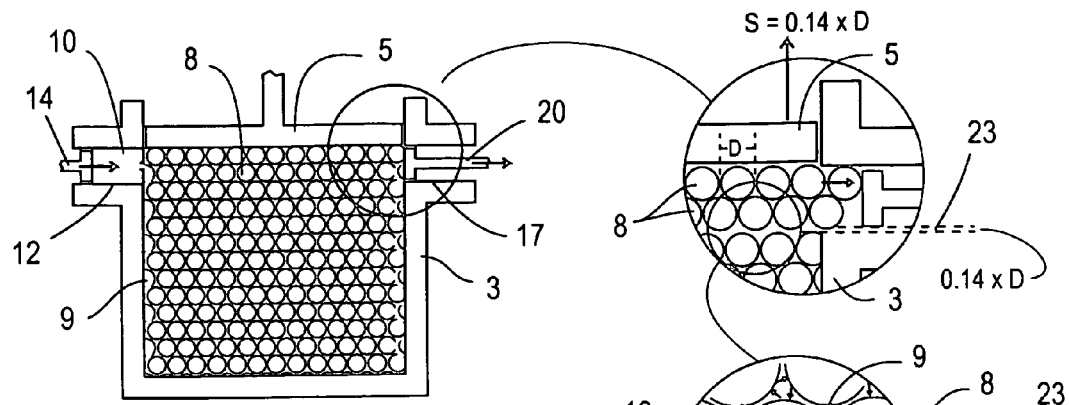
FIG. 1A
FIG. 1B
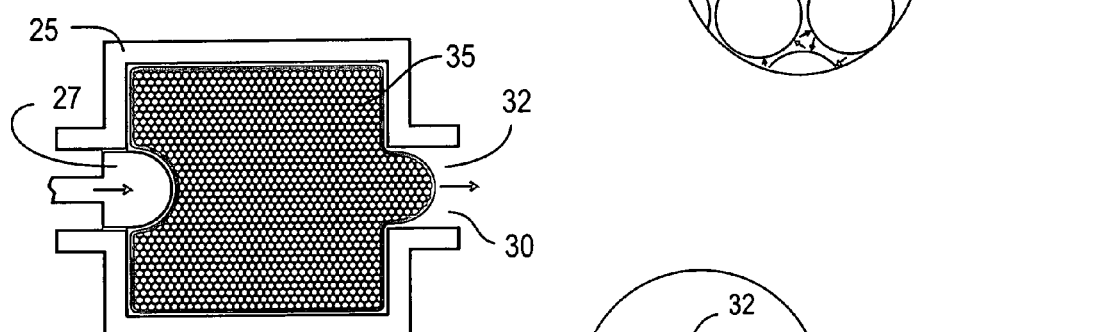
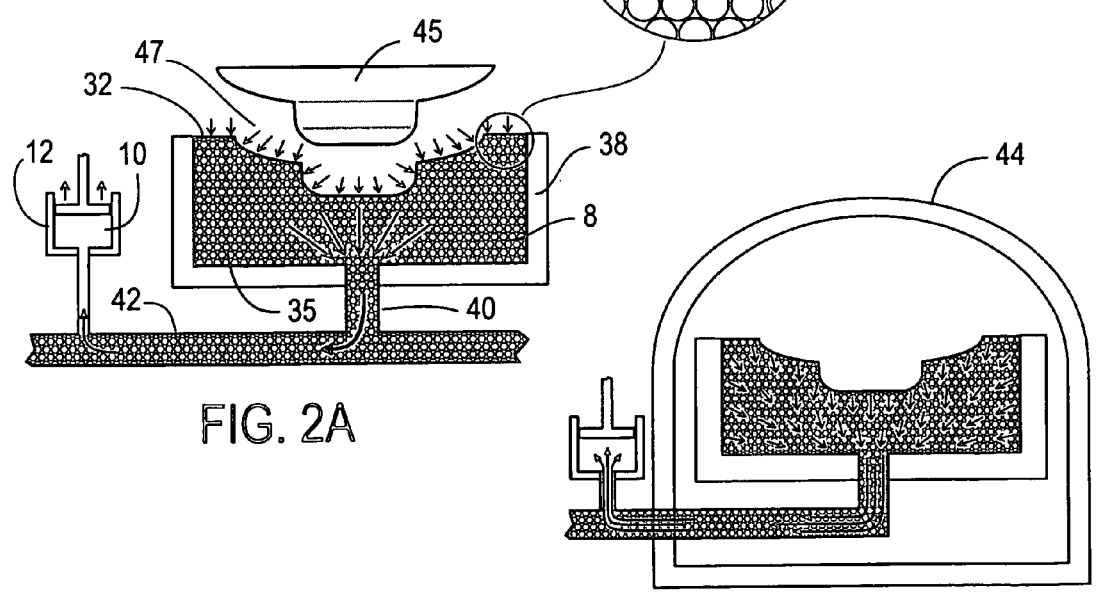
FIG. 2A
FIG. 2B

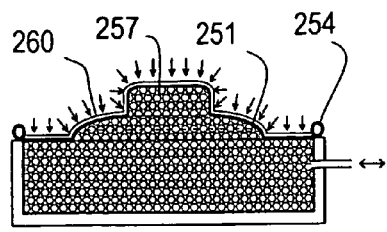
FIG. 13A
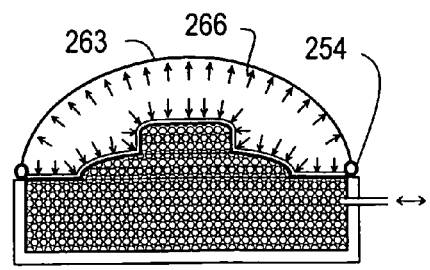
FIG. 13B
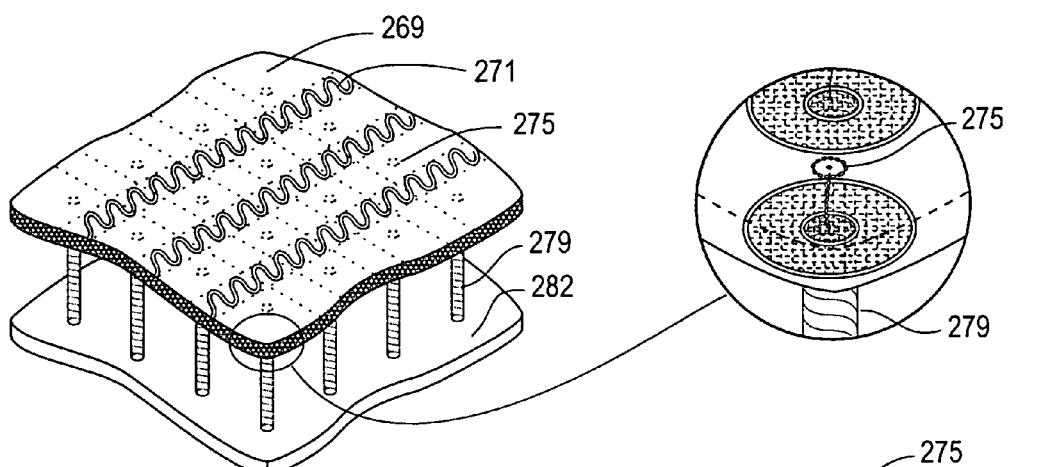
FIG. 14A
FIG. 14B
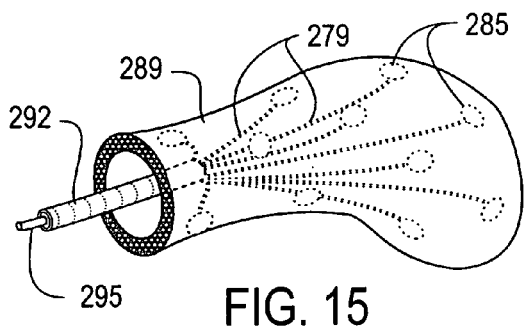
FIG. 15
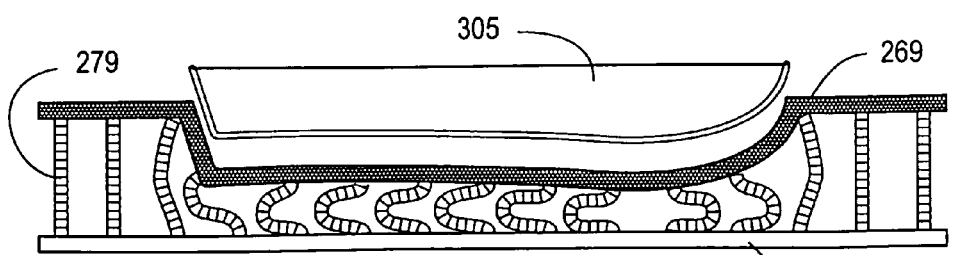
FIG. 16

USE OF STATE-CHANGE MATERIALS IN REFORMABLE SHAPES, TEMPLATES OR TOOLING

CROSS-REFERENCE TO RELATED APPLICATION

This application is a continuation of U.S. patent application Ser. No. 10/150,747, filed May 17, 2002, now U.S. Pat. No. 6,780,352, issued Aug. 24, 2004, which is a continuation-in-part of U.S. patent application Ser. No. 09/478,956, filed Jan. 7, 2000, titled "The use of State-Change Materials in Reformable Shapes, Templates or Tooling," now U.S. Pat. No. 6,398,992, issued Jun. 4, 2002, which claims priority from U.S. Patent Application No. 60/115,472, filed Jan. 11, 1999, titled "Generation of Stable Near-Net Shapes from Confined, Mobile, Lockable Particle Masses (The use of State-Change Mediums in Reformable Shapes, Templates or Tooling)," the entire disclosures of which (including all attached documents) are incorporated by reference in its entirety for all purposes.

BACKGROUND OF THE INVENTION

The present invention relates generally to reformable materials, and more specifically to mixtures, primarily solid/liquid mixtures, that can be formed into desired shapes and then re-used to form other desired shapes. The desired shapes may be end products, or may be templates or tools used to form end products or other templates or tools.

The prior art for making molds or tooling deals for the most part with fabricating, machining, layered deposition forming, molding or casting of tools for a single dedicated purpose. While the tools may be modified or the materials recycled, often this is accomplished only with multiple steps and at considerable expense. Specific instances of quickly reformable molds have been found that rely on beads, sand or other particulate materials being blown or poured into a container with at least one flexible or elastically extensible surface. An article is pushed against or surrounded by the flexible surface and the contained particulate material, and then a vacuum is pulled on the container to remove air so that ambient air pressure consolidates the beads or particles and holds the flexible surface against them in the shape of the article. Likewise, numerous instances have been found of cushions, pads or seats that rely on introducing or vacuuming air from a bead-filled, flexible or stretchable sealed envelope, while other instances have been found of reformable shapes comprising flexible envelopes that contain mixtures of beads or microspheres combined with binding yet flowable lubricants or highly viscous materials. Some of these shapes have been made temperature responsive, so that heat would soften them and cooling would harden them.

The following U.S. patents relate to casting, molding, and fabrication:
U.S. Pat. No. 2,517,902 (Luebkeman);
U.S. Pat. No. 3,962,395 (Hägglund);
U.S. Pat. No. 4,931,241 (Freitag);
U.S. Pat. No. 5,198,167 (Ohta et al.);
U.S. Pat. No. 5,262,121 (Goodno);
U.S. Pat. No. 5,348,070 (Fischer et al.);
U.S. Pat. No. 5,374,388 (Frailey);
U.S. Pat. No. 5,928,597 (Van Ert et al.);
U.S. Pat. No. 5,957,189 (Uzaki et al.);
U.S. Pat. No. 5,971,742 (McCollum); and
U.S. Pat. No. 6,224,808 (Essinger et al.).

The following U.S. patents relate to formable objects of use:
U.S. Pat. No. 3,608,961 (Von Heck);
U.S. Pat. No. 4,327,046 (Davis et al.);
U.S. Pat. No. 4,885,811 (Hayes);
U.S. Pat. No. 4,952,190 (Tarnoff et al.);
U.S. Pat. No. 5,093,138 (Drew et al.);
U.S. Pat. No. 5,556,169 (Parrish et al.);
U.S. Pat. No. 5,881,409 (Pearce); and
U.S. Pat. No. 5,966,763 (Thomas et al.).

SUMMARY OF THE INVENTION

In brief, the present invention provides a reversible state-changeable mixture comprising a plurality of solid bodies and a carrier medium, with the carrier medium filling any voids or interstices between the bodies. Within the mixture, the solid bodies can be caused to transition from a formable state, preferably a near-liquid or fluent condition of mobility, to a stable, force-resisting condition through introduction and then extraction of a slight excess quantity of the carrier medium beyond that required to fill the interstices of the bodies when closely packed. In most embodiments, the carrier medium is a liquid preferably excluding any air or other gases from the mixture, and most of the discussion will revolve around such embodiments. However, some embodiments use a carrier medium that is a liquid-gas froth.

The mixture can be rapidly shifted from a formable (preferably near-liquid or fluent) state to a stable force-resisting state and back again to the formable state, through slightly altering the carrier-solid proportions of the mixture, and the invention further provides methods and apparatus for using the mixture. Embodiments are characterized by one or more of the following advantages: the ability to pressurize a mixture and drive it against a complex surface as if it were a liquid; the ability to create a "near-net" or extremely accurate representation of a shape due to the negligible volumetric change that accompanies a state change; the ability to effect the state-change with a very small volume of single-constituent transfer and with consequently small actuation devices without the need for a vacuum pump, without chemical reactions, and with no need for thermal or electrical energy to be applied to the mixture; the ability to greatly alter the volume of any elastic or otherwise dimensionally changeable container, envelope or chamber through the free-flowing transfer of the mixture from one container to another; and the ability to tailor the mixture to satisfy a wide variety of physical specifications in either the flowable or the stable state.

The mixture can be used in reformable molds or other shaping tools, and in reusable templates that capture the dimensions of impressed shapes for transfer to a mold. The mixture can also be used in any product or shape that benefits from the incorporation of arbitrary reformability or precise reconfigurability. The mixtures further provide useful properties for use in a wide range of shock-absorbing, leveling, protective and supportive elements or apparatus.

The mixture in its formable state may be loosely compared to quicksand, while the mixture in its stable state may resemble hard-packed sand or even cement, with the transition being caused by the transfer of a relatively small amount of liquid. Hence the mixture, while in the formable state, includes enough liquid to fill the interstices between the nested solid bodies, and an excess amount of liquid that is referred to as the transition liquid. In the stable state the transition liquid is absent and the bodies are completely packed or nested.

In preferred embodiments the solid bodies are uniform, generally ordered, and closely spaced, with the predominate mass of the bodies close-packed and touching. To create mobility, the transition liquid is introduced in just-sufficient quantity to create a fluent condition by providing a clearance between some of the bodies, which clearance permits the introduction of at least two simultaneous slip planes between ordered masses of the bodies at any point in the mixture. The bodies themselves separate freely from one another under movement of the liquid and without turbulent mixing, and shift relative to one another generally in ordered bulk masses. The bodies should be of a density that is close enough to that of the liquid to permit flow of the bodies along with the liquid, or should have a size or structure that facilitates movement of the bodies along with the liquid.

In a method according to an embodiment of the invention, the surface of the mixture while in the formable state is first made to conform to a desired shape. The bodies in the mixture are then caused to transition from the fluent condition to the stable condition through extraction of the transition liquid. This extraction removes the clearances required to provide slip-planes between ordered masses of the solid bodies, thereby causing the bodies to make nested, packed, interlocking or otherwise stable consolidated contact. The mixture, now in the stable state, has a surface that conforms to the desired shape.

The invention provides methods for using the mixture in molds, templates or other products through holding the mixture in, or transferring quantities of the mixture while in the fluent condition into and out of variable-contour or variable-volume containers or chambers. The mixture can be stabilized by removal of the transition liquid, which may cause an elastic membrane to be pushed against the consolidated bodies by ambient pressure, or by transition liquid removal that causes the solid bodies to pack together under liquid tensile forces, thereby creating an ordered, deformation-resisting structure through surface friction or through surface adhesion of one body to another.

Certain preferred embodiments of the invention provide for holding the mixture inside a container or transporting the mixture into a container with at least one flexible, elastically deformable and stretchable wall, and then extracting the transition liquid from the mixture so as to cause body-to-body contact and force-resisting stability through pressure external to the container acting on the confined, ordered, abutting bodies. Transfer of fluent mixture into and out of the containers, or displacement of mixture within the containers can be accomplished by pressure forces within the mixture, with these forces being distributed uniformly throughout the mixture by the liquid carrier medium.

This distribution of uniform pressure against the surface of each body, coupled with the clearance volume furnished by the transition liquid, assures that the bodies are not forced against one another while the mixture is in the fluent condition. This elimination of body-to-body compression forces in turn prevents the bodies from sticking together and resisting displacement while the mixture is in the fluent condition. Pressure forces in the liquid can be exerted through pressing a shape against an elastic, stretchable membrane that constitutes at least one surface of a chamber substantially filled with the fluent mixture, or such forces within the liquid medium of the fluent mixture may be induced by a two-way pump or other transfer system.

The bodies themselves may have various geometries and may be provided within a state-change mixture in one uniform type, or there may be two or more types or sizes of bodies dispersed or layered within a mixture. For example spherical bodies of one size might have smaller bodies filling the interstices between the larger bodies, or a layer of short fiber bodies might float above a layer of spherical bodies. Flake-like bodies can be also be used, in which case the flat faces of the bodies can be pressed against one another to create a force-resisting body mass. The flat faces provide many times the contact area of abutting spheres, with accordingly higher friction or adhesion potential when consolidated against one another. If the flakes are in the form of a laminate that has one side heavier than the carrier medium and one side lighter, and if the flakes are closely spaced and in a medium which suppresses turbulence and solid body tumbling, the bodies will tend to be supported in, and to be consolidated in, an ordered parallel configuration. In this case, as with the spherical bodies, the transition liquid quantity will be just sufficient to create shear motion of body masses under low displacement forces.

Mixtures with more than one type or size of body can be used with the bodies either intermingled or layered separately, as by differing densities or the inability of bodies of one layer to pass through bodies in the adjacent layer. Bodies of different sizes or types may also be separated from one another by flexible or extensible porous materials or fabrications that allow passage of liquids but not of the confined bodies.

The degree of accuracy or irregularity on the surface of a stabilized mass of the mixture is dependent upon the relationship between the fineness of the bodies and the dimensions to be captured, a covering membrane's thickness and conformability, and the size and degree of regular packing order of a state-change mixture's solid bodies. If the bodies are very small compared to the contours of a shape that is to be replicated, or if the interstices between larger bodies in the mixture are filled by such smaller bodies, the mobile solid bodies of the mixture will consolidate and assume a near-net shape relative to any impressed shape when the transition liquid is extracted from the mixture.

In additional embodiments, the mixtures are stored external to one or more molds, tools or fixtures, and are selectively introduced, stabilized and made fluent again in the tools. Formulas of the mixtures or solid bodies and liquids of the mixtures may be stored separately, and may be mixed or separated as required for effective operation of separate elements of a forming or tooling system.

In yet other embodiments, flexible elements containing state-change mixtures are used to capture exterior or interior contours of a shape and to transfer the contours to other state-change elements. Through such "templating" operations a negative of a shape or surface may be produced and then a shape or surface identical to the first may be produced by forming the surface of a mixture against the transfer template. Individual elements might also be used to transfer portions of one shape to another shape and so create variations that combine the contours of two or more shapes into a single shape.

In still other embodiments, several elastic, extensible elements filled with state-change mixtures slide freely upon one another and relative to the contained mixtures in order to conform to highly contoured shapes. These embodiments would be used when the elastic stretch of a single membrane element is not sufficient to capture details of a shape.

Further embodiments include methods of displacing fluent mixtures within variable-volume flat elastic envelopes by pressing the envelopes against shapes with exterior air or liquid pressures, or pressing with physical elements such as bundles of rods or fingers that slide relative to one another. The pressing force pressurizes the liquid carrier medium and causes the envelopes to extend and conform to the shapes as the contained fluent mixtures flow within the envelopes under the uniformly distributed pressure forces within the liquid. Embodiments also contemplate the creation of hollow voids within a mixture-containing envelope, with the impressed shape causing the collapse of the voids so that the mixture need not be pumped into and out of a chamber to permit capture of a shape.

Yet other embodiments include methods for creating a sculptable condition in specific state-change mixtures through placing the mixtures in a quasi-stable state. The solid bodies are held in contact by extraction of a portion of the transition liquid, yet have sufficient lubricity or low contact friction to be displaced relative to one another by externally imposed forces. The bodies can be displaced into voids created within a mass of the quasi-consolidated mixture, or can be progressively displaced along the surface of the mixture from one region of the mass to another. In some embodiments, properties of flow of the mixture and the resistance to deformation of the abutted bodies are predetermined so as to be a function of the imposed external forces, and so to be subject to variable control that allows intermediate quasi-stable, sculptable or displaceable conditions within or on the surface of the bulk mixture.

State-change mixtures may also use solid bodies along with a state-changeable liquid carrier medium. The method for changing the mixture from fluent to stable and back again is, as described above, through transfer of a small amount of excess liquid; however, the mixture can be further solidified by changing the state of the carrier medium from liquid to solid.

In yet another embodiment, a state-change mixture is consolidated within a mold chamber and the liquid carrier or a second liquid component is circulated while held to a pressure below ambient. Through heating and cooling of the circulating liquid, the mold itself can be heated or cooled.

Still another embodiment of the state-change mixture has solid bodies that are hollow and very light, and a carrier medium comprising a liquid-gas froth of similar density. The froth is destroyed when extracted since the gas within it expands and separates from the liquid component; then the froth is reconstituted from the liquid and gas and reintroduced into the body mass to recreate a fluent mixture. The liquid component of the froth may be a solvatable (solvent-releasable) adhesive that can dried to hold the consolidated bodies together and then re-dissolved by the frothed carrier medium. Very light bodies can also surrounded by a denser liquid, with the mixture likewise becoming fluent and then stabilized with transfer of a small quantity of transition liquid; however, the tendency of the bodies to adhere together under contact pressure is preferably countered, or liquid-like transfer of the mixture, especially through small lines or passages, becomes difficult if not impossible.

In additional flat envelope embodiments internal and external elements improve their functioning as lightweight tooling and templates. Included are methods to support these mixture-containing envelope structures, both internally with flexible reinforcements and externally with tubular 'foot' structures that also contain state-change mixtures. The flat envelopes may also be backed or supported by liquids or dry media as extensively shown in prior art; e.g., U.S. Pat. No. 5,971,742 to McCollum, U.S. Pat. No. 5,374,388 to Frailey, U.S. Pat. No. 3,962,395 to Hägglund, and others. However, the novel properties of the current invention improve significantly on the art by combining the ability to capture precise impressions of a shape with the ability to be switched from a liquid-like state to a firm state, or even to a fully hardened state that resembles concrete yet can be returned to a formable condition.

Finally a diagram of a prototype tool-forming system is shown, and operations are described in which shapes are impressed by pattern parts against a single membrane backed by the state-change mixture; the mixture is consolidated by transition liquid removal; and the mixture is then hardened into a porous tool by the extraction of water vapor from the residual liquid, thereby activating a water-soluble adhesive. The prototype system is self-contained on a rolling cart and the tool can be separated from the system for use in various materials forming processes.

To reiterate, according to embodiments of the invention, the state change from liquid-like to solid-like properties within the mixtures is effected by the transfer of a small amount of excess carrier medium, the transition liquid, into and out of the mixtures. When the transition liquid is present, preferably in just-sufficient quantity to create the degree of support and clearance that provides for at least two slip-planes, the solid bodies have a degree of mobility similar to that of the liquid medium of the mixture. The slip-plane condition of mobility can be generated through very small liquid pressure differentials or through externally imposed forces that displace the carrier liquid and the supported bodies along with the liquid. Ordered bulk masses of the bodies can shift relative to other ordered masses at any point within a continuous volume of the mixture, and the location of the slip-planes can fluidly shift under any slight differential force transferred from one body to another. It is preferred to prevent frictional contact between bodies during such force transfer by having the liquid medium of the mixture furnish a viscous or 'streaming' resistance to contact, and also for the medium to furnish a degree of body-surface lubrication so that light body contacts do not create friction between bodies.

Lubricity under high contact forces, as is required for many lubricating media, is not necessary within the mixtures since the bodies are in effect free-floating during flow, with any imposed liquid pressure forces being uniformly distributed against the surface of each body. For example a nearly ideal aqueous liquid medium can be formed by dissolving a small quantity of a soluble long-chain polymer such as polyethylene oxide into water. The medium carries solid bodies of a similar density without turbulence and friction-producing contact, allows the bodies to make non-lubricated surface contact when the medium is extracted, and causes the bodies to readily separate when the transition liquid is reintroduced.

When the transition liquid is extracted so that the solid bodies are in a stable configuration with ordered, packed and consolidated contact, the degree of resistance to externally imposed forces depends on such tailorable, engineered physical properties as body shape, body elasticity and compressibility, body surface properties of roughness, smoothness or natural molecular adhesion, residual adhesiveness or lubricity of the liquid medium on the contacting surfaces, surface tension of the medium, and variations of liquid medium or body properties with changes of temperature or pressure; alteration of the resistance properties through replacement of the first liquid with a second liquid medium, rinsing of the bodies and the first medium with a second or sequential liquid media, vapors or gaseous fluids; and any other engineered variations in the bodies and first liquid medium, and in other sequential introductions of various fluids into the mixtures or through the consolidated bodies. Any adhesive or clinging contact between the bodies is preferably relieved through polar molecular action of the first liquid medium, or through an intermediary treatment with other liquids or fluids prior to reintroduction of the first liquid medium.

A further understanding of the nature and advantages of the present invention may be realized by reference to the remaining portions of the specification and the drawings.

BRIEF DESCRIPTION OF THE DRAWINGS

FIGS. 1A and 1B show a mixture of packed spherical bodies, surrounded by a liquid medium in a container with a piston lid, and further show ordered masses of the bodies undergoing shear or slip-plane movement by addition of a small excess of the medium;

FIG. 2A shows a reformable tooling system in which a state-change mixture flows through small-diameter piping, is displaced from a chamber by a shape being pressed into a surface membrane and is stabilized by extracting the quantity of excess medium (transition liquid);

FIG. 2B shows the chamber of FIG. 2A in a vacuum chamber, with the state-change mixture being stabilized with liquid extraction alone exerting a consolidation force on the bodies of the mixture;

FIG. 13A shows a membrane envelope being forced against a shape by extracting air between the membrane and the shape; and FIG. 13B shows a membrane envelope being pushed against a shape by pressure applied between the envelope and an outer membrane.

FIGS. 14A and 14B show a membrane envelope portion with internal reinforcement and external support elements;

FIG. 15 shows a thin envelope embodiment that closes on itself to create a thin-shell internal mandrel;

FIG. 16 shows a side view of a supported membrane envelope after it is formed and consolidated.

DESCRIPTION OF SPECIFIC EMBODIMENTS

Figure 3A:
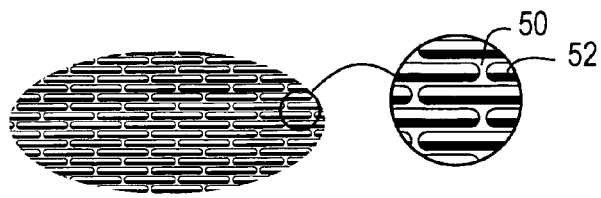
FIGS. 3A–3D show mixture bodies of varying geometries.

Behavior of State-Change Mixture Comprising Solid Bodies and a Liquid Medium (FIGS. 1A and 1B)

FIG. 1 through FIG. 3 introduce aspects of the invention including properties of various state-change mixtures, their behavior, and state-change operations.

FIG. 1A shows a chamber 3 with a piston-type lid 5 that is pressing on ordered, spherical, hard solid bodies 8 that are surrounded by a liquid medium 9 with the same density as the bodies. Chamber 3 has on its left side a tiny chamber 12 closed by a piston 14, which chamber contains an excess amount of liquid medium, hereinafter referred to as transition liquid 10. Chamber 3 also has on its right side a port 17 with a piston 20. Initially lid 5 is pressed against the solid bodies, causing them to be packed and nested against one another inside chamber 3. Therefore, the packed and abutted bodies act as a solid fill in regard to their resistance to compression.

The first enlargement of FIG. 1A shows lid 5 raised just enough to allow an ordered layer of bodies 8 to clear adjacent stacked layers. As the lid is raised, transition liquid 10 is added from chamber 12 by movement of piston 14 to fill the added clearance volume 23 with transition liquid. By measurement or calculation, the distance that the lid must be raised to establish this clearance is approximately 14% of the diameter of the spherical bodies. Therefore, if the bodies are of small diameter, the added volume to allow clearance is also very small.

The first enlargement also shows a bulk quantity of ordered bodies undergoing shear or slip-plane movement relative to the stationary mass of ordered bodies. This is caused by a further advance of piston 14, which drives more liquid into the mixture, forcing piston 20 out by increased liquid pressure and creating a volume within chamber 17 that the moving bodies fill. Free movement of the bodies can occur due to the increased clearance volume 23 between ordered rows of the bodies, with the clearance volume being filled with a quantity of transition liquid 10. Since there is a density match between the bodies and the liquid medium, this ordered quantity of bodies can move relative to the stationary mass of bodies along with the pressure-driven flow of the liquid medium, and with no more force than is necessary to cause flow in the medium. If this bulk movement were intended to occur at any point within the volume of the mixture, the total amount of clearance would have to be at least twice the amount shown or 28% of body diameter, since a bulk quantity of spherical bodies would have to clear stationary spherical bodies along at least two slip-planes rather than one as shown.

A second, further enlargement shows bodies 8 surrounded by liquid medium 9 and a quantity of transition liquid 10. Any pressure within the medium is distributed evenly against the bodies, while close body spacing assures that any displacement of the medium tends to carry along with it a constant, ordered volume of the bodies. Since the volume of transition liquid can be very small in proportion to the total mixture volume, any bulk transfer of the mixture is essentially a transfer of ordered, nearly packed solid bodies. This behavior of the bodies means that, in regard to flow qualities, the bodies in the mixture behave substantially as the liquid medium behaves.

These flow characteristics can be improved by adding a small quantity (generally less than 1% by volume), of a soluble long-chain polymer to the liquid medium. While the polymer somewhat increases the viscosity of the medium, a valuable benefit is that it aids in "streaming" the bodies past one another without friction-generating contact, with the suspended molecular chains acting as a zero-friction cushioning medium. This cushioning property is believed to facilitate non-contact momentum transfers from body to body, and the close-spacing of bodies in conjunction with this momentum transfer assures that slip-planes can form simultaneously and freely at any point within a mixture that has enough transition liquid added to form at least two slip-planes.

When piston lid 5 and piston 20 are returned to their first positions, the amount of transition liquid within clearance volume 23 is driven out of the mixture by displacement and returned to medium chamber 12. The piston lid then pushes against the ordered bodies 8, which resist the piston since they are again in a regular, packed, consolidated configuration, and they again furnish resistance to further motion. Due to the very small difference in volume between the packed, compression-resisting bodies and the liquid-borne mobile bodies, in effect the mixture is behaving as a state-change fluid with mobile and solid transition states.

FIG. 1B further emphasizes the liquid-like flow characteristics of the solid-body containing mixture. A chamber 25 has a piston 27 and an open port 30, and contained within the chamber is the sealed elastic envelope 32 that contains incompressible, mobile state-change mixture 35. The mixture has an excess quantity of transition liquid within it, giving it liquid-like flow properties. As the piston is advanced into the chamber, the membrane begins to conform to the piston's contours. At the same time, any force exerted on the mixture by the piston is converted to pressure forces exerted equally throughout the chamber. This pressure force causes the membrane to be stretched outward into the open port as the piston is advanced against the membrane, and a volume of the mixture equal to the displacement of the piston will move into the stretched portion. Due to the extremely small volume of excess transition liquid, the displaced mixture volume is essentially the same as an equal mass of ordered, packed solid bodies.

Application of State-Change Mixture (FIG. 2)

FIG. 2A shows the elements of a system using the materials and principles of FIGS. 1A and 1B to achieve a practical result. An open container 38 has elastic envelope 32 filled with mobile state-change mixture 35 and this envelope has a port 40 communicating with a mixture transfer manifold 42. The elastic envelope could be replaced by a membrane that is sealed across the opening of container 38, as long as the container is completely sealed except for its connection to manifold 42. Transition liquid chamber 12 is attached to the manifold rather than container 38, and the mixture is free to flow through the manifold. When an impression-making pattern part 45 is impressed into the free surface of envelope 32, a volume of the mixture equal to the volume of the pattern is displaced and flows out of the chamber-constrained envelope. Piston 14 is then drawn upward to extract transition liquid 10, causing all solid bodies of the mixture to make consolidated, ordered contact. If the extraction force of piston 14 is increased beyond the low level necessary to remove the excess, then a "negative" pressure relative to ambient atmospheric pressure will be created within the mixture if it is contained in a sealed envelope and manifold. Depending on the properties of the mixture, consolidation under atmospheric pressure may or may not be necessary to achieve desired levels of consolidated resistance to externally imposed forces.

The impression created by part 45 is now a stable structure 47 and is a negative representation of the shape that was pushed against the membrane. Stability of this impression is caused either by the inherent abilities of the mixture to cause the solid bodies to cling together, or by the ambient pressure pushing against the membrane and the membrane pushing the bodies into locking contact. Therefore, the result of confining the mixture within an elastic envelope, providing one surface of the envelope as a surface membrane, providing flow of the mobile mixture into and out of the envelope, and providing a method to add and extract excess liquid medium, is to create a formable and reformable surface that can easily conform to an impressed pattern, that can then be stabilized, and that can repeatedly be made either conformable or stable with the transfer of a small quantity of transition liquid.

The enlargement of FIG. 2A shows some of the limitations and constraints on the accuracy of an impression created with these solid-body/liquid mixtures and a confining membrane that is pushed against the bodies by exterior forces such as ambient atmospheric pressure. The dashed line shows the profile that, ideally, membrane 32 would assume. In fact the membrane tends to follow the contours of the surface bodies; however, it can be appreciated that there is a relationship between the membrane thickness and the size of underlying solid bodies that determines the surface "smoothness." From testing it has been determined that the surface is essentially smooth if the solid bodies have a maximum dimension of no more ½ the thickness of an elastomeric membrane made of latex rubber, silicone, or urethane. Apparently the compression of the membranes at regions of inward indentation (into the surface gaps between contacting bodies) thickens these regions. Also, perhaps there is a tendency, through isotropic distribution of forces in an elastic membrane, for the outer surface to be flat despite small ripples or indentations on the opposing surface. As will be shown in FIGS. 3F and 3G, other "smoothing" solutions can be applied with mixture variations and combinations.

FIG. 2B shows a third, generally unrecognized consolidation force that can be applied by the liquid medium. Container 38, along with the mixture contained behind a membrane, is now located within a vacuum chamber 44 that has been evacuated. Liquid medium 9 along with the quantity of transition liquid 10 has no dissolved gases, an extremely low vapor pressure at ambient temperature, and the capability to "wet" the surfaces of the bodies and the membrane. In addition to the commonly understood action of consolidating particulate or granular fill through evacuating air from the containing sealed envelope, there is an additional consolidation force that can be imposed on bodies within the container through using the tensile strength of the liquid medium. This can be done by direct liquid extraction, as with a piston and cylinder, or by indirect methods such as a vacuum within a connected liquid reservoir. This tensile property is rated in terms of atmospheres of negative pressure, and while theoretical tensile strengths of common liquids range from 200 to 1,000 negative atmospheres (roughly −3,000 to −15,000 psi), more easily achieved laboratory results are in the range of 20–30 negative atmospheres (−300 to −350 psi). Assuming that the problems of adsorbed gases on the bodies or liquid-contained gases can be handled in practical devices (easily overcome in laboratory samples), it can be appreciated that consolidation forces far in excess of that achievable by air evacuation (limited to 14.7 psi) can be achieved by direct liquid extraction. Essentially, the solid bodies of the invention would be forced against one another as if tensile strands were attached to each body and to the membrane and all strands were pulled at once through manifold 42, thereby driving membrane 32 against the bodies and the bodies against the container surfaces. Therefore, consolidation would take place even if a vacuum existed on the outer face of the flexible membrane.

Figure 3B:
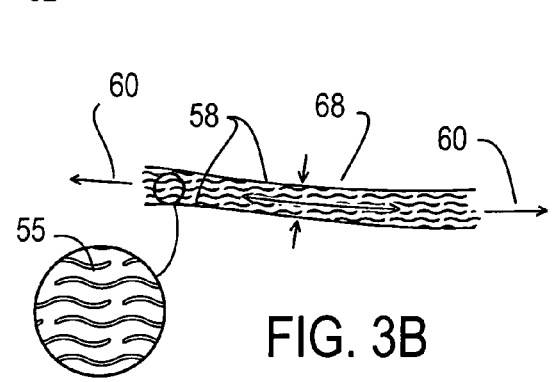
Figure 3C:
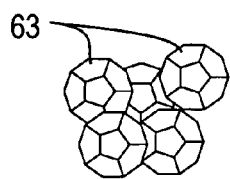
Figure 3D:
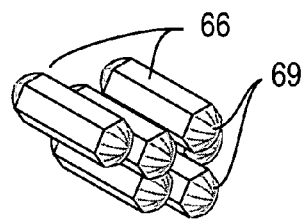
Figure 3E:
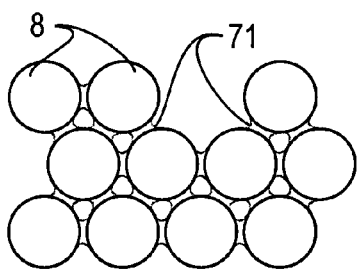
FIG. 3E shows bodies adhered together by liquid surface tension.

Further Mixture Descriptions (FIGS. 3A and 3E)

FIG. 3A shows a state-change mixture in which the solid bodies are geometrically regular flakes with rounded edges, and the bodies are aligned and generally held parallel to one another due to limited clearance and due to having a dual-density, self-orienting property. For instance the bodies might be formed from a laminate in which the top half 50 is of lower density than the liquid carrier medium, and the bottom half 52 is of higher density, with the combination having a similar density to the medium. With a small quantity of excess liquid (the transition liquid quantity) that perhaps furnishes no more than a few molecular layers between each body, the bodies will be supported and easily moved with respect to one another by liquid flow as previously described. The edges of the bodies might be rounded, as by a tumbling and polishing operation, to facilitate this liquid-supported motion without having sharp or flat edges collide and stick to one another. The medium might also incorporate a "cushioning" or lubricative material such as the soluble polymers previously described.

As with the spherical bodies, when the flakes are consolidated into ordered contact with one another they again create a compression-resisting mass or structure dependent upon the surface properties of the bodies and the consolidating forces applied to the body mass. The flakes have many times the contact area of spheres and so could have proportionately greater surface friction, adhesion, or other desired properties. A mass of consolidated flakes would also tend to be denser, have higher laminar strength, and be less resilient than spheres of the same materials, since more material is contained within the mass and more material is in contact. A disadvantage of the flakes might be a greater tendency to stick together and to rotate out of alignment when mobile, as for instance under shear forces that are exerted perpendicularly to the aligned contacting surfaces. The flakes could be returned to an oriented state simply by suspending them in a considerable excess of carrier medium; however, this might not be compatible with an application where accurate shape replication is required. In regard to sticking, there may be commercially available surface treatments, such as the adhesion of partially cross-linked soluble polymer formulations that will cause liquid-immersed surfaces to separate.

FIG. 3B shows another type of mixture, with the bodies 55 being closely spaced short fibers. Since the fibers have a density matching that of the liquid carrier medium, they tend to flow with the medium when it is displaced, yet do not rotate or disorient due to the close spacing and "streaming" characteristics of the carrier medium, such as are furnished by dissolved long-chain polymer solutions. In this figure the displacement is caused by linear stretching 60 of a thin membrane envelope 58 containing the mixture. With a constant-volume containment, this stretching causes a thinning 68 of the state-change mixture. It is contemplated that the fiber-like bodies would tend to move freely due to being partially aligned with the direction of flow, yet remain in a generally uniform and ordered structure. When the fiber bodies are forced together by extracting the transition liquid and causing ambient pressure to drive the membranes against them, a stable continuous mat is formed.

The stabilized mat thus formed will tend to resist extension or compression in the plane of the mat if the fiber-bodies' surfaces have a significant coefficient of friction. If thin, the mat thus formed would tend to be flexible and springy if the fibers were likewise springy. The fibers as shown also have a wavy or smoothly crimped geometry that would tend to make them more resistant to slipping when the mat is flexed, and adherence of the membrane to the surface layers of fibers would also aid in maintain dimensional stability despite flexing. It is envisioned that, among other uses, a fiber filled mixture in such a thin envelope could be used as a stretchable "pattern" for taking custom clothing dimensions. For instance filled envelopes might be incorporated into a spandex-like garment that is slipped on while the contained mixture is in the mobile state, and is then stabilized by extracting the transition liquid. The pattern garment might have multiple zippers or other separable means of joining so that it could be removed without putting excessive force on the consolidated mat structure within each envelope.

FIG. 3C shows nesting dodecahedrons 63 with nearly the same mobility and freedom of multi-directional slip-plane formation as is furnished by spherical bodies. However, as with other regular polyhedrons, these bodies can be solidly packed when consolidated and so have a compression resistance equal to the parent material. In addition there can be near-complete or total surface contact of the bodies with its attendant advantages or disadvantages.

FIG. 3D shows hexagonal rod elements 66 with rounded ends 69. These would again be ordered and closely spaced in the mixture, and would furnish a high degree of packing and surface contact. A consolidated mass of such rod-like bodies would tend to have a directional beam strength aligned with the long axis, and strength would be a function of the length of the rods which would affect the number of discontinuities in a consolidated mass. Applications might include but not be limited to structures that resist "breaking" or crumpling along one axis under impacts or imposed forces, yet deform or progressively crumple along another axis of stress.

Other types of solid bodies might be used without departing from the spirit of the invention. For instance, besides spheres, flakes, regular polyhedrons, rods and the like, shapes with protuberances or hollows could be used. Some of these bodies might even mate together under consolidating force and require extensive pummeling or rolling forces to be again separated. Likewise flakes might be wavy, have various perimeter shapes etc. There might also be an extensive variety of surface properties, such as low-friction surfaces that will permit slip-displacement even when the bodies are forced together, or high-friction "waffle" surfaces that completely resist slip-displacement when consolidated together. The surfaces might even have suction-creating surfaces or other means for causing the bodies to cling together mechanically so that the consolidated state-change mixture has considerable resistance to tensile as well as compressive forces. Similarly the medium might have specific switchable properties, for instance performing as a lubricant or, under desired force, electrical, chemical or temperature conditions, acting as an adhesive that binds the bodies when they are consolidated against each other. Finally, as will be further described in reference to FIGS. 10A and 10B, the carrier medium might itself be a material with a reversible state-change, such as a paraffin or a eutectic alloy that melts and solidifies within a useful temperature range.

The invention's method for providing near-liquid mobility, and either following or preceding that condition with a stable force-resisting state, may be further understood by considering the elementary model of FIG. 3E. The solid bodies 8 are shown free of containment and all forces other than liquid-medium surface tension at contacting regions. To reach the condition shown, first the transition liquid is extracted, and then further extraction reduces the liquid between particles to separate surface-tension "membranes" 71 that connect each body. Surface tension would cause the remaining fluid to force the already generally ordered solid bodies into stable, ordered, consolidated contact. Conceivably bodies with regions of mating contact, and with interstices remaining open to liquid flow between the bodies after contact, could have sufficient liquid removed that surface tension forces alone would push smooth mating surfaces into adhesion-generating contact. The polyhedrons and rods of FIGS. 3C and 3D might have small grooves or rounded edges to facilitate liquid medium extraction, which might be facilitated by driving the liquid out with air or another gas. Driven by surface tension and by electromagnetic forces between extremely smooth surfaces, any remaining liquid might be driven out, allowing relatively strong surface adhesion forces to develop. With the liquid medium reintroduced between the bodies, surface tension forces would cease to operate and polar molecules of the medium would again wet the bodies and wedge the mating surfaces apart.

It can be appreciated that this body-to-body adhesion, which is a prerequisite with many body types for developing tensile strength within the particle mass, can be furnished in numerous ways. For instance a solvatable adhesive can be used, in which case the liquid carrier medium may be a mixture of the adhesive and solvent. After consolidation, the liquid medium is drained or driven out of voids between bodies and the solvent is driven off by heating or dry air, leaving each body bonded to its neighbors. When the medium is reintroduced, the adhesive bonds between the bodies are dissolved and mobility via the transition liquid may again be used. While the solvent-adhesive mixture might leave elastic bonds, a sodium silicate or "water glass" carrying medium could be used to create a rigidly bonded particle mass. Additional thermally switched adhesive media can also be imagined, such as thermoplastics with a low melt viscosity, waxes, water-based formulation or even water alone.

Figure 3F:
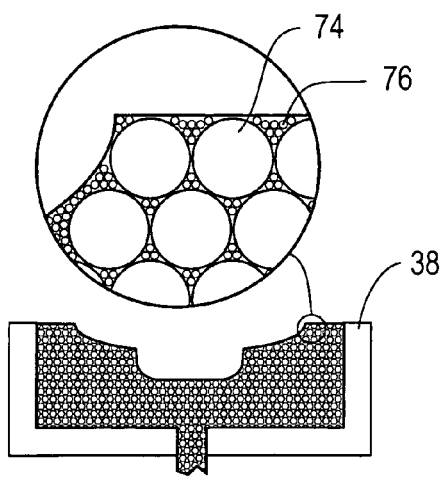
FIG. 3F shows two bodies of differing sizes within a single mixture.

FIG. 3F shows blended bodies of two different dimensions within a mixture. Bodies 74 have smaller bodies 76 that are sized to fill the interstices between the larger bodies. Several advantages can be obtained that include but are not limited to the following examples. One advantage is to reduce the amount of carrier liquid and transition liquid required for a mixture, since the interstices between the larger bodies contain solid bodies rather than liquid alone. The smaller bodies also spread the point loading on the bodies while under compression as well as provide a smoother, higher-resolution consolidated surface than would be furnished by the larger bodies alone.

The smaller bodies could also furnish conditions of increased or reduced friction between the larger bodies, with or without a carrier liquid filling the bodies' interstices. The blending of different sizes of bodies could also allow tailoring of the coefficients of thermal expansion (CTE) of state-change mixtures, for instance by adding more of fewer of the smaller bodies with a higher CTE than the larger bodies. This blending could of course include two or more types of smaller bodies with differing CTE's that are preblended before being mixed with the larger bodies. The larger bodies would aid in maintaining a stable mixture even if the smaller bodies were of varying densities. This mixing of complementary body types could be used to control a wide range of mixture properties beyond these examples as long as bodies of the mixtures remained properly distributed or could be returned to proper distribution without elaborate procedures.

Figure 3G:
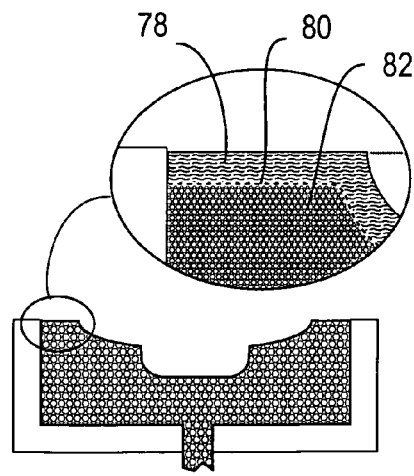
FIG. 3G shows bodies of one type that float on bodies of another type or are separated from underlying bodies by a liquid-passing veil material.

FIG. 3G shows a layer of bodies 78 of one type that float on or are separated from underlying bodies 82 of another type by a liquid-passing veil material 80. The veil material may be a perforated stretchable elastic sheet, a knitted or woven fine fabric, or any other extensible or stretchable form of material that separates the bodies yet allows the carrier and transition liquid to flow freely into and out of the mixture. Bodies of two differing densities could also be used of course, with the lighter bodies rising and forming a layer on the surface or against a confining membrane as previously described.

Advantages could be gained by the differing properties of each body layer. For instance a top layer of fine fibers might produce a tool with increased deformation or impact resistance yet might have poor ability to pass liquid due to the fibers' small diameters or entanglement characteristics. A bottom layer of larger spheres would allow the rapid passage of liquid into and out of the mixture and could also have a higher degree of stiffness in bulk than the fiber bodies alone would have.

Figure 4A:
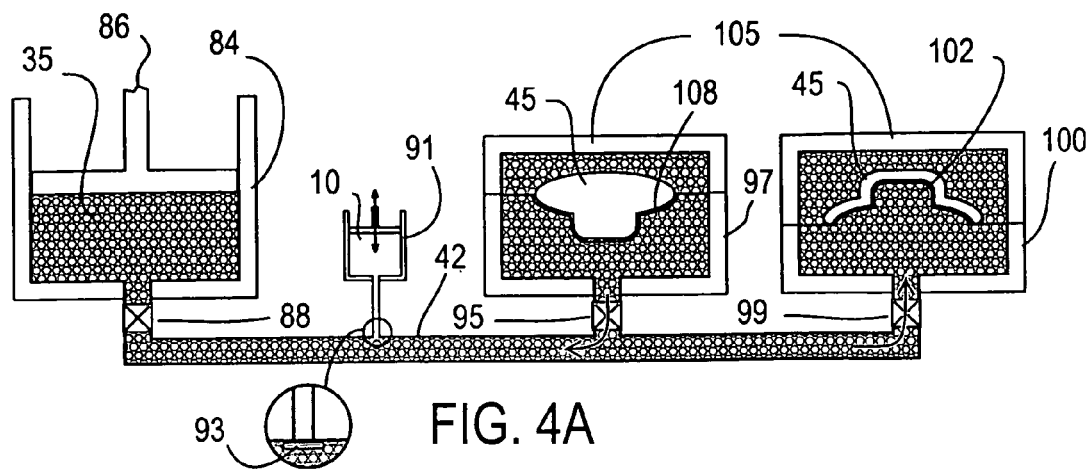
FIGS. 4A and 4B show a molding system in which a fluent mixture is transferred from storage into and out of state-change molds or tooling and is changed from a fluent state to a stable state and back to a fluent state.
Figure 4B:
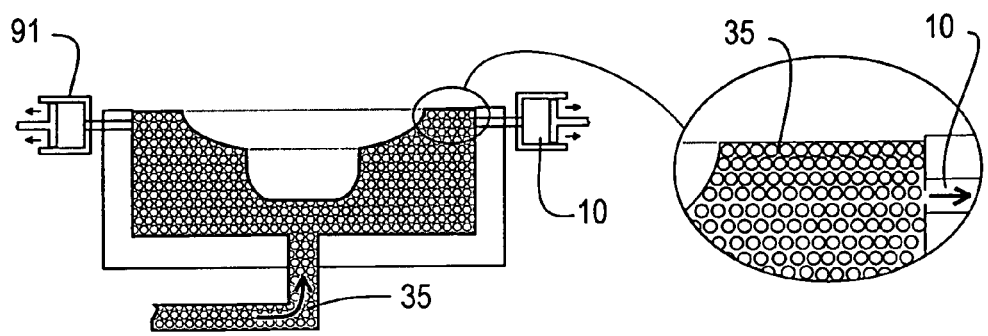

Elements of a Practical Molding or Templating System (FIGS. 4A and 4B)

FIG. 4A shows the main elements of FIG. 2A along with other elements for two significant applications of the state-change mixture in a practical molding and other impression-capturing or templating system. Starting from the left, the first element of the system is a storage and transfer system 84 that holds a sufficient quantity of the state-change mixture to allow a variety of shape-capturing operations to be performed by the system. Any reversible pumping mechanism (not shown) capable of transferring the mixture could substituted for the transfer system piston 86 by being placed in the transfer line or manifold 42.

Valves 88, 95 and 99 may be included at the openings from manifold 42 to transfer system 84 and mold containers 97 and 100 that are likewise connected to the manifold. While not essential for operation of the system, such valves can serve at least two purposes. One is to isolate mixtures not undergoing state-changes, so as to minimize the amount of transition liquid 10 that must be transferred to effect the mobile-solid transitions. In addition, these valves would allow impression-capturing operations to take place independently in the containers 97 and 100, which can be connected to or isolated from transfer system 84 by the valves.

The second element from the left is a reversible transition liquid transfer device 91 with a solid body screen 93, so that the medium can be added or removed from the body mass without also adding or removing bodies from the total mixture volume that includes the quantities in the manifold. If the impression-capturing containers are isolated from the manifold 42, then device 91 would have to be connected directly to the mixture volumes of each container, as shown in the following FIG. 4B. It can be appreciated that bodies of the mixture alone can be stored in system 84, and liquid for interstitial fill along with transition liquid can be stored in device 91.

The third element from the left is an impression-capturing container 97 with a holding cap or lid 105 that can secure a pattern part 45 in a desired position and orientation. The lid itself may also comprise a container holding a state-change mixture behind a membrane, perhaps with a tack-release adhesive on the outer surface to hold the part against the lid membrane. The lid could also be connected to manifold 42, perhaps through a flexible manifold line. The container is shown after part 45 has been pushed into the lower-container membrane. When the bodies are locked in place as described with reference to FIG. 2, a "female" tool 108, in the form of a negative impression of the part, has been created.

The fourth element of the system is a similar impression-capturing container 100 with lid 105. The lid holds a part 45 that has a cavity, and the state-change mixture has been pumped from the transfer chamber to push the membrane into the cavity. When the bodies of the mixture are locked in place by extracting the medium with the two-way pump as previously described, a "male" tool 102 has been created that protrudes above the lower container.

It can be appreciated that either container, with the form-creating shape (part 45) removed, can be used as a mold or die to produce a replica of the shape. For instance a curing liquid polymer can be injected into the left-most container, or a soft, deformable material "blank" can be formed in the right-most container by operating it as a pair of matched dies, through the actions of lifting the lid, placing the blank over the male tool, and then pressing the lid down against the blank.

FIG. 4B shows one method for imparting maximum accuracy to the stabilized surface of a membrane with a mixture of one uniform body type. As transition liquid 10 is extracted mobile mixture 35 continues to flow under pressure into the container. The FIG. 4B enlargement shows the result of this continued flow coupled with the placement of liquid transfer elements 91 near the top of the membrane surface. As transition liquid is removed, the solid bodies (shown with exaggerated size and spacing) gradually become closely packed, allowing time for any slip-planes to be filled in. If extraction of liquid 10 caused the membrane to push against the bodies prior to eliminating any slip-planes, the gaps in bodies along such planes might be locked into place, causing deformities or irregularities in or underlying the membrane surface and so mar or weaken the negative representation of the impressed shape.

Such packing could also be facilitated by using floating bodies of lower density than the liquid carrier medium. The bodies would then tend to self-pack, due to their buoyancy, against an upper or lower surface. The surfaces of the bodies would have to have very little contact friction or tendency to adhere together under light contact forces; otherwise there would not only be resistance to the bodies' filling-in of any voids or slip-planes. There might also be the well-recognized problems of settling and sticking together as occurs with many particle suspensions, especially when there is a density mismatch between the solids and the suspending liquids. As previously described, having a transition liquid quantity, and having either matching densities or "cushioning" non-contact properties in the liquid medium can eliminate such friction and adhesion problems between bodies as long as the body surfaces themselves are not prone to stick together either with our without full immersion in a liquid carrier medium.

Insert or Template Applications (FIGS. 5A–5E)

Figure 5A:
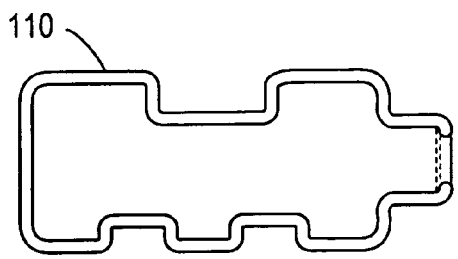
FIGS. 5A–5C show elastic-membrane inserts being collapsed and then expanded inside a hollow shape by filling them with a state-change mixture.
Figure 5B:
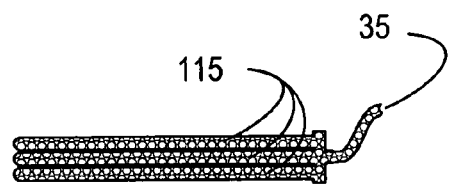
Figure 5C:
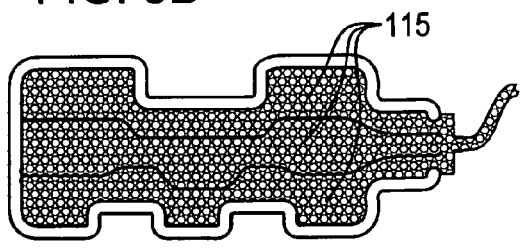

FIG. 5A shows a hollow shape 110, and FIG. 5B shows a group of thin, elongated membrane-template elements 115 that can fit through the open neck of shape 110. The template elements are connected to a supply of the state-change mixture, such as transfer system 84 of FIG. 4A, coupled with a transition liquid transfer mechanism such as element 91. Elements 115, shown in FIG. 5B, are pushed into the hollow shape and filled with the mixture so as to completely fill the interior as shown in FIG. 5C, and transition liquid is extracted from all of the elements simultaneously to stabilize them.

Figure 5D:
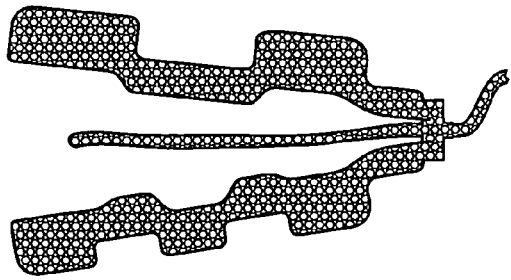
FIGS. 5D and 5E show stabilized templates of the hollow shape's interior and a mixture-filled mold to which the templates' shapes can be transferred.
Figure 5E:
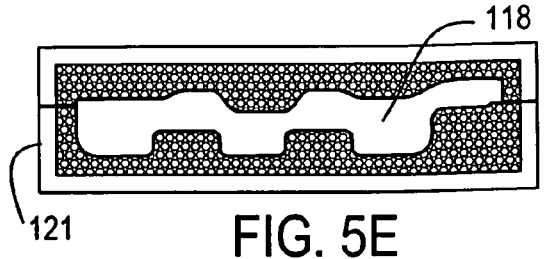

Since the solidified elements are together much larger than the open neck of the shape, one or more of the elements must now be emptied of the state-change mixture to allow extraction of some of the solidified elements as shown in FIG. 5D. After the stable elements are extracted, the shape is preserved by a transfer process, in which the elements are used to create a negative shape 118 in the state-change container-mold 121 shown in FIG. 5E. The dimensions of this element can then be recreated at any time by reinserting an emptied membrane element into the mold, refilling it with the state-change mixture and then stabilizing it.

The formed and stabilized template elements 115 are then placed back in hollow shape 110 along with the non-filled elements. The non-filled elements are filled and solidified, the first set of solidified elements are now emptied of the state-change mixture and removed, and the now-solidified elements can again have their contours preserved in a transfer mold 121. It can be appreciated that, by this iterative process, the entire volume and any contours of the hollow shape's interior can be templated, and at the end of the process a complete "male" tool replica of the interior will be created from the membrane elements.

This male tool replica of the hollow shape's interior can then be used, along with a female tool replica of the exterior of the shape, to produce a replica of the shape with a moldable material. For instance, to make a replica of the hollow shape from a curing liquid polymer, the male tool needs to be held in the same location inside the female tool as the interior hollow of the shape has in relation to the exterior of the shape. The space between the male and female tools is then filled with the polymer, and after its cure the interior male tool is reduced again to the unfilled bundle of membrane elements and removed, while the female tool is opened and the finished part removed. If all of the solidified elements of the male tool have been templated by female mold cavities, then the elements can be quickly reconstituted from the female molds without again being applied to the interior of hollow shape 110, and the original hollow shape can be quickly replicated again.

It can be appreciated that numerous variations of this replication process can be performed without departing from the spirit of the invention. For instance the original hollow shape might be split into sections so that the iterative process, just described, of forming a male replica of the interior, is instead done in a single step, with the sections of the shape being put together, the interior being templated, and the sections being taken apart again to free the interior template. As yet another example of variations, the male tool could be used to produce a female mold that would then be used to shape a single, larger membrane-element shaping tool.

Additional variations include making modifications to the shape. As an example, one or more of the shape elements 115 could be placed into container-mold 121 along with a newly created small nested shape that fits into one of 115's concavities. When formed and solidified, the resulting cavity 118 of mold 121 will be a single new shape that blends the contours of element(s) 115 and the exposed portions of the nested shape.

Figure 6A:
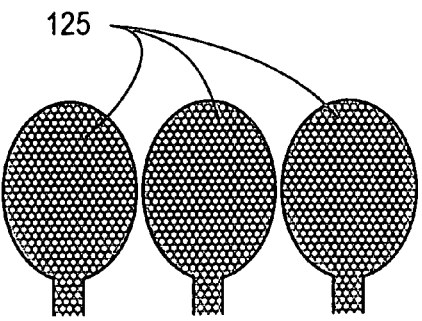
FIGS. 6A and 6B show elastic-membrane envelopes being grouped together to form a complex cavity and further shows the membranes sliding freely over the bodies and each other to arrive at the final shape.
Figure 6B:
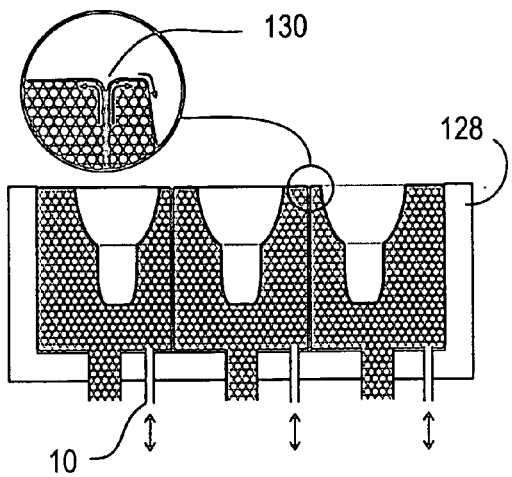

Grouped Membrane Elements to Replicate Highly Contoured Shapes (FIGS. 6A–6B)

Groups of membrane elements have another valuable property besides the iterative shape-capture abilities described with reference to FIGS. 5A–5E. Since elastic, extensible membranes have a finite limit in terms of their degrees of stretch, replicating shapes with a great deal of variation might require limiting the degree of stretch of any one element by sharing the elongation amongst two or more membrane elements or envelopes. FIG. 6A shows a triplet of balloon-like elements 125, while FIG. 6B shows the elements inside a common container 128. The surfaces of the membranes are lubricated or otherwise free to slip past one another in addition to being freely mobile over bodies of the state-change mixture within, as shown at region 130 in the 6B enlargement.

As a complex and highly contoured shape is pushed into the membrane envelopes, the surfaces of the membranes stretch. Due to the mobility of the membranes this stretch is not localized, i.e., limited to the portions of the surfaces in contact with the shape, but rather distributed along each membrane. In other words the sides, and perhaps even the bottom of each envelope, contribute to the stretch of the membrane portions in contact with the shape. In effect the "free surface of stretch" encompasses much of the membrane envelope instead of being limited to the top surface.

Figure 7A:
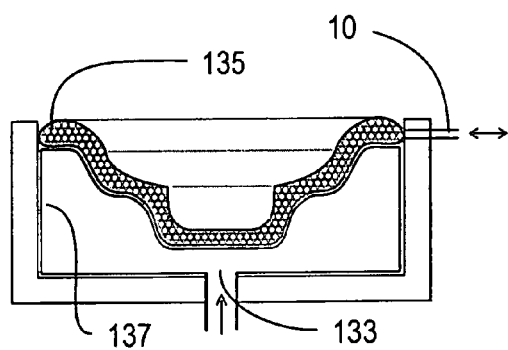
FIGS. 7A–7D show state-change mixtures that are not transferred, and shows them in thin envelopes that are pushed against shapes by fluid pressure and an array of sliding pins, and further shows the tips of an array of pins with small volumes of mixture in separate envelopes, and also shows the mixture in a chamber with expandable fluid-filled elements within the mixture volume.
Figure 7B:
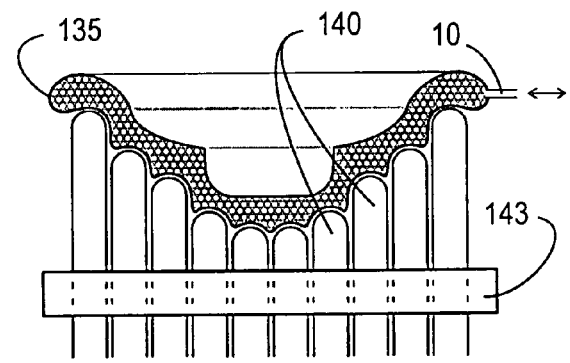
Figure 7C:
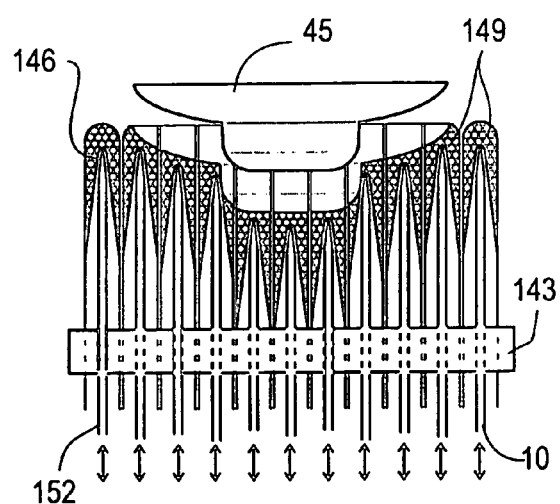

State-Change Mixture in Constant-Volume Elastic Envelopes (FIGS. 7A–7C)

FIG. 7A shows an embodiment of the invention that minimizes the volume of state-change mixture required to replicate a shape, and also eliminates the need to transfer the mixture into and out of a shape-capturing container. While in a formable state the mixture is held in a thin elastic-membrane envelope 135 that is driven against a shape by a fluid (gas or liquid) 133. The fluid might be contained in a second underlying flexible, extensible envelope 137, so that it will easily stretch and conform against the envelope containing the state-change mixture yet will not leak out around the edges. The state-change mixture is then solidified, and if a compressible fluid has been used to force it against the shape, the pressure must be released before the shape is removed. The resulting rigid template of the shape can be used while still in place in the surrounding container, or it can be removed as a shell and applied to other uses. For instance, it can be placed into transfer mold 121 of FIG. 5E, in effect being used as a transfer template to replicate the impressed face of the original shape.

This embodiment might also use a second state-change medium in underlying envelope 137, with the mixture contained by having the upper envelope 135 sealed to the open top of the container. If envelope 135 held a heavy state-change mixture as will be described with reference to FIG. 10A, then it might be desirable to give the mixture a stable "bed" of a much lighter state-change mixture. It is contemplated that such an embodiment might be used in which a very hard and durable reformable tool would be prepared in the upper envelope and then used for molding or stamping operations for which such stable backing is necessary.

FIG. 7B shows another embodiment of the concept that minimizes the volume of state-change mixture required to replicate a shape. A series of pins 140 in an array 143, with the pins free to slide past one another, can be used to push envelope 135 against a shape. If the pins are then locked in place and the state-change mixture solidified, a template, die or mold surface is created that again has the same degree of stability as furnished by the full volume of solidified mixture in rigid containers as previously described.

FIG. 7C shows a variation of pin array 143 that also combines the multiple-envelope feature of FIGS. 6A and 6B. Each tip 146 of the pins has mounted on it a shaped elastic membrane envelope 149 containing a state-change mixture, with each envelope connected to a transition liquid transfer mechanism via the lines 152. With the contained mixture in the mobile state, the pins and mounted envelopes are pushed against a pattern shape, or the shape is pushed down against the pins that offer resistance to being moved. The pins are then locked in place and transition liquid is extracted to solidify the mixture, again creating a stable impression or negative of the pattern shape.

The pins can have a variety of other forms. The pin itself might comprise an envelope that contains a state-change mixture, so that even more shape-assuming versatility is possible. For instance the envelope-pins would be able to expand sideways into deep or long undercuts in a shape, or they might be used inside a hollow body as shown in FIGS. 5A–5E, and likewise be iteratively filled and stabilized with the dimensions transferred to other pin arrays or transfer molds for "storing" impressions of the shape. The envelope-pins might also have a smaller stiff pin or one or more flexible "spine" pins within the envelopes that could be selectively placed or withdrawn to further facilitate shape-capturing or stabilization of solidified pin elements. The pins could also contain fillable voids as will be shown in the following FIG. 7D and FIGS. 8A–8D.

Figure 7D:
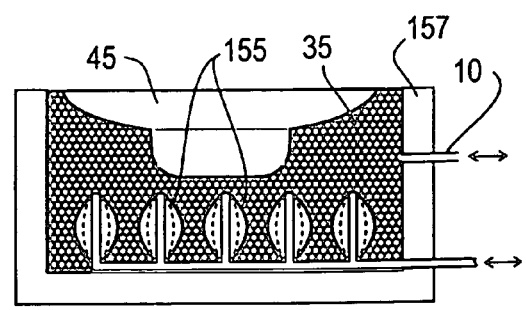

FIG. 7D shows another state-change mold or templating system in which the mixture 35 is not transferred into or out of a mold chamber. Instead there are expandable elements 155, and a fluid is transferred in or out to vary the volume within the chamber or cavity of mold 157. This fluid could again comprise a state-change mixture, although it's not Impression-Molded Mixture with Voids (FIGS. 8A–8D)

Figure 8A:
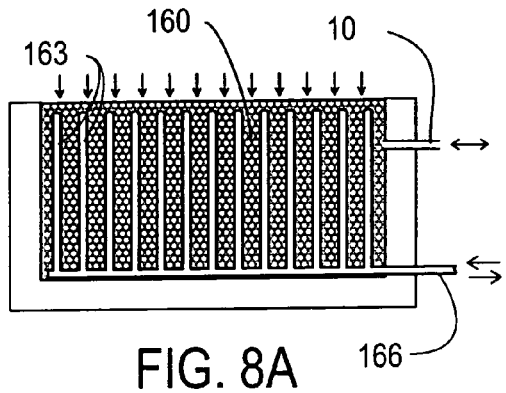
FIGS. 8A–8D show voids within sculptable, quasi-stabilized volumes of state-change mixtures, and shows impression-forming of the mixture by pushing a shape or tool against a surface membrane and driving solid bodies into the voids, and also show displacement-forming of the mixture by pushing bodies along the surface.

FIG. 8A shows a volume of state-change mixture 160 that can be molded into a desired shape by taking advantage of "quasi-stable" properties that are achieved by allowing ambient pressure to consolidate the bodies, yet making provision for displacing the bodies. An array of flexible, thin-walled tubes 163 permeate the volume of the mixture, and when the array is pressurized with a fluid 166 (liquid or gas) and then drained, a void structure is created within the volume of bodies. The volume with voids is stable, since ambient pressure also acts within the drained tubes to push against the surrounding bodies with the same force as imposed on the membrane.

Figure 8B:
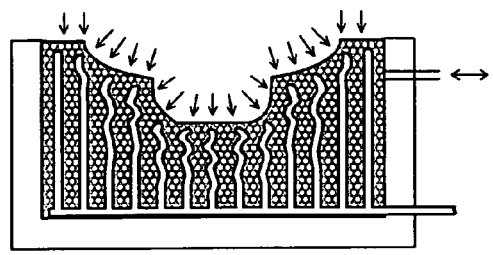

FIG. 8B shows the volume of state-change mixture after an object has been pushed against the surface membrane. The void elements of the void structure have partially collapsed, furnishing room for the displaced bodies of the mixture to move away from the region of displacement created by the object. Ambient pressure against the membrane keeps the bodies stable, and the non-collapsed void structure is then refilled with a liquid, or perhaps with a state-change mixture, in order to keep the volume of the state-change mixture from further collapsing when the formed shape is used as a mold or tool.

Figure 8C:
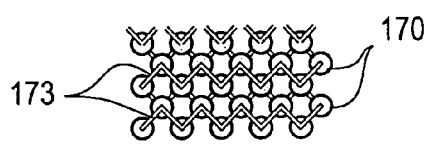

FIG. 8C shows another type of void structure. This is created by a three-dimensional array of hollow, collapsible nodes 170, much like tiny balloons, which are interconnected by flow tubes 173. The void structure resides inside a volume of state-change mixture in the same manner as the tube structure in FIGS. 8A and 8B, and is likewise filled with a fluid, drained, and then refilled with an incompressible liquid or state-change mixture after the mixture is displaced to the desired shape. It is envisioned that such a regularly-space, many-void structure could fill perhaps 80% of the total mixture chamber volume, and so permit a higher degree of displacement-forming than tube structure 163. This distributed-node structure creates what is in essence a quasi-stable, selectively collapsible "foam" structure, in which the bodies have a large percentage of evenly distributed void-volume into which they can be displaced.

Figure 8D:
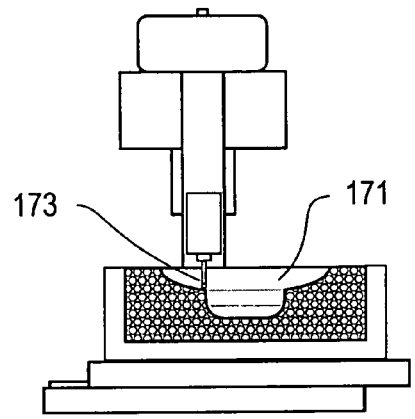

FIG. 8D shows how an indentation or impression 171 could be automatically "sculpted" into a void-filled volume of the state-change mixture. An automated milling machine has a small shaping or sculpting tool 173 mounted in its spindle, which doesn't need to rotate. The sculpting tool is a small ball, and the mill creates the desired shape with two distinct operations. The first operation is a tamping motion, with the tool pushed repeatedly against the surface of the mixture to rough out the shape, thereby leaving a dimpled surface. In the second operation, the ball is moved with a sliding motion along the membrane to smooth out the surface. There is a surface lubricant (not shown) to allow the ball tool to slip freely over the containing membrane without catching.

The thin mixture-containing envelope of FIG. 7B, supported on a pin array could also be sculpted by use of such an automated tool. However, this envelope, as well as the envelope-tipped array of FIG. 7C, might be formed to shape much more quickly than a bulk quantity of the medium as previously discussed. Each pin could be moved separately from the surrounding pins by being pushed vertically by a tool, with the whole array being quickly "punched" into a predetermined position. Following this positioning, the pins would be locked in place and the smoothing motion of the tool applied.

Figure 9A:
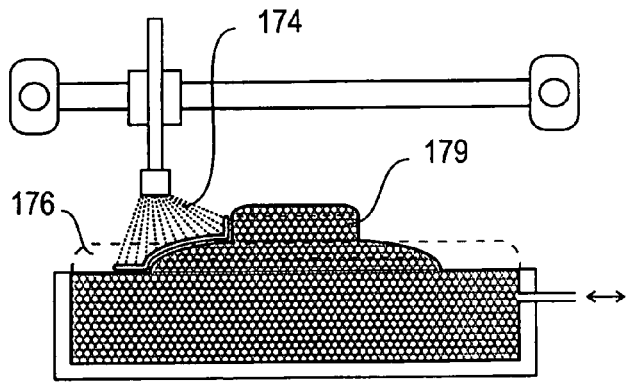
FIGS. 9A and 9B show a sculptable volume of the state-change mixture being shaped by progressively displacing mixture bodies along a membrane surface with a device that assumes a variety of profiles.
Figure 9B:
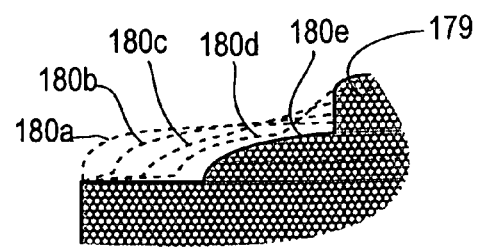

Displacement Sculpting (FIGS. 9A–9B)

FIG. 9A shows another type of automated shaping tool 174, while FIG. 9B shows a progressive displacement-sculpting method. The shaping tool is of a "profilometer" type, in which a smooth contact element is automatically configured through a sequence of curves as it moves over the sculptable surface. The tool is used to progressively and sequentially displace the state-change mixture as shown at 180*a–e*, with an enveloping membrane being held against the surface bodies by pressure differential as previously described. The tool moves a layer of bodies along the surface of the underlying bodies, in effect "sweeping" them along beneath the surface of the membrane, which slips freely under the tool and also over the surface of the stationary beads underlying the displaced beads. Through a series of such sweeping movements, a portion of the body mass 176 is displaced to create the desired shape 179. It can also be appreciated that the sweeping tool can be used to impression-mold a state-change mixture with voids, and it is contemplated that both the impression-molding and displacement-sculpting methods would be used together in many forming operations. The profilometer tool could also be used for tamping, and would perform such an operation in addition to the sweeping or smoothing operations, much more quickly than could the single ball tool of FIG. 8D. Such a profiling device could also be used with the envelopes and pin arrays of FIGS. 7B and 7C, as well as with the non-membrane system to be described with reference to FIG. 10B.

Further Mold and Tool Embodiments (FIGS. 10–16)

Figure 10A:
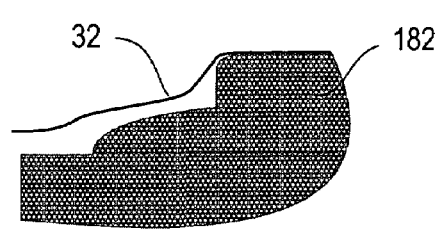
FIGS. 10A and 10B show state-change mixtures with state-change liquid media and a mold system that dispenses with a surface membrane.

FIG. 10A shows a state-change mixture 182 that has a state-change carrier liquid medium. This might be, for instance, a paraffin or a eutectic alloy that changes from a liquid to a solid at a temperature that is useful for mold or tool applications. As earlier described, the bodies of the mixture are preferably of the same density as the liquid so as to be neutrally buoyant. For instance paraffin and polyethylene beads have practically the same density, while indium-based eutectic alloys have densities that can be matched by various copper, lead and tin-alloy beads or bodies. The membrane 32 that allows the ambient-pressure stabilization of the mixture is shown being removed. If, for instance, the indium alloys were used with hard metal beads to which there is good alloy adherence, the resulting form would be a substantially hard-surfaced metal tool that is suitable for stamping, high-pressure injection molding and the like. Prior to cooling the mixture except at the surface and after the bodies are consolidated, the mixture might be drained to create a porous substructure so that molten liquid could be reintroduced into the interstices to effect a rapid melting of the bonds between the bodies. Heated air, steam or like gases might also be used to preheat the consolidated and solidified mass prior to heated liquid medium introduction.

Figure 10B:
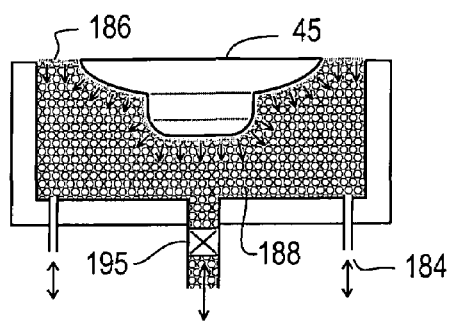

FIG. 10B shows another mixture 188 with a thermal state-change liquid carrier medium 184, in a mold system that dispenses with the membrane envelope. Instead the exposed surface 186 of mixture 188 is cooled so that the liquid begins to congeal as pattern part 45 is pressed into it. The excess fluent mixture is drained through valve 195 as the part further deforms the surface, and then thermal liquid 184 is drained while surface 186 is further cooled. The mixture can again be consolidated by ambient pressure, since the congealed and cooled surface is air-impermeable.

The non-membrane system of FIG. 10B can also be used with a mixture in which the solid bodies seal against each other upon contact, especially if the layered embodiment as shown in FIG. 3G is used. For instance the layered flake or fiber and microsphere mixture of FIG. 3A could be impressed with pattern 45, with the pattern part being coated with an anti-stick layer. Draining of the transition liquid would cause the flake bodies to make contact, following which the very slight dimensions of any interstices could further permit consolidation under ambient pressure. In effect the surface flakes would form a barely permeable skin, aiding in consolidation of the entire body mass.

Figure 10C:
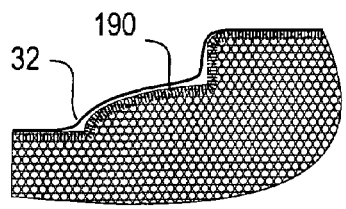
FIG. 10C shows a shaped, consolidated, drained, and hardened porous mixture with the membrane removed, a hardenable coating material applied, and the membrane replaced and used to force the coating into the surface pores between the consolidated bodies.

FIG. 10C shows a technique for adding a surface coating to a shaped and hardened porous mixture without affecting the "net shape" or precise dimensions of the mixture's surface. As an example, with the membrane removed a hardenable liquid epoxy material 190 is brushed or sprayed onto the surface in sufficient quantity to permeate to a predetermined depth. Small openings or uncoated areas are left at the "low" points on the formed surface, i.e., those points that the membrane will contact last as it is pressed by atmospheric pressure due to a vacuum being applied to the porous mixture.

The membrane serves to press the coating material into the pores of the bodies near the surface, with the material around the uncoated areas having the coating squeezed over them as the membrane beds down against the formed surface. While a surface created in this way would not be reformable, it could be removed after use by softening the underlying mixture. If undamaged in use, this surface shell could then be stored for future use as with any permanent tool facing and could be used alone or with a consolidated/hardened state-change mixture backing it.

Figure 10D:
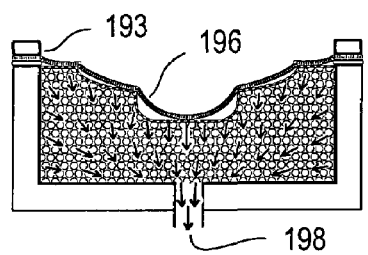
FIG. 10D shows a shaped and hardened porous mixture with the membrane replaced by a formable film or sheet material.

FIG. 10D shows a porous hardened tool, with the surface membrane removed, being used as a "vacuum former." Clamp 193 is used to form an air tight seal between a formable sheet 196 and the tool's open top. If the sheet is thermoplastic, it can be heated to formability and then forced down against the tool surface by atmospheric pressure as vacuum 198 is applied. Other formable materials or materials combinations, such as a "prepreg" composite sheet material overlaid with an airtight membrane, can also be formed. The surface coating previously described could also be applied to increase the durability or impermeability of the porous tool, with vacuum draw holes being drilled in the surface as is done with conventional thermoforming tools. Likewise the coated shape could be used as a durable nested fixture which holds thin-shell parts for various trim and fabrication operations.

Figure 11:
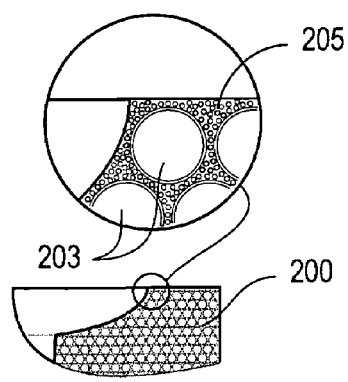
FIG. 11 shows a mixture comprising hollow beads and a fine-celled liquid foam or froth in place of the liquid medium.

FIG. 11 shows a low-density state-change mixture 200. In this example, hollow beads 203 are carried in a frothed medium 205 comprising small, stable bubbles. As with the earlier-described mixtures, this mixture can flow and be pumped to and from containers through small-diameter tubing or piping, yet still constitute a "mobile solid" that is stabilized by extracting the froth to below ambient pressure. The froth would likely return to a liquid state since the bubbles would expand and rupture when the carrier liquid was suctioned from the mixture container as previously described. However, the froth could be reconstituted from the liquid and pumped into the bodies to regenerate the mobile mixture.

This lightweight state-change mixture could be usefully used in at least two situations. For instance if a very large template were required, such as for capturing the dimensions of a domed ceiling, then the light-weight mixture would make the operation much easier to accomplish, using a variation of FIG. 7A in which the membrane envelope is sealed around the perimeter and pushed against the ceiling with vacuum/atmospheric pressure differential as previously described. As another example, if a low contact pressure is required for capturing dimensions, such as when preparing a negative mold of a burn victim's face, then the low density of the mixture combined with a very soft conformable membrane configuration would allow such a delicate procedure.

The frothed medium might serve an additional function when the bodies are consolidated by suction of the froth from the body mass. The bodies could have their surfaces wetted by residual liquid after the bubbles were ruptured, and if the liquid had an adhesive quality when dried, then a drying gas could be passed through the bodies with the gas pressure held below ambient pressure and the bodies would adhere together while retaining the formed shape. If the adhesive also bonded the membrane to the surface bodies, then the formed template or tool could be made resistant to a vacuum exterior to the membrane, and so could be used for vacuum-assisted thermoforming or fixturing operations. After use, the frothed medium would be reintroduced to wet the adhesive and so free up the bodies to again be mobile.

A light, stable, bonded form of the mixture as described could also find a permanent or semi-permanent use, as for a custom seat or hand grip item. In this case the elastic membrane might have a durable exterior, such as a nylon-fiber stretch-fabric, and the bodies might be elastomeric so that the items are resilient. If a softenable adhesive were used as just described, then the item could be reformed as desired.

Figure 12A:
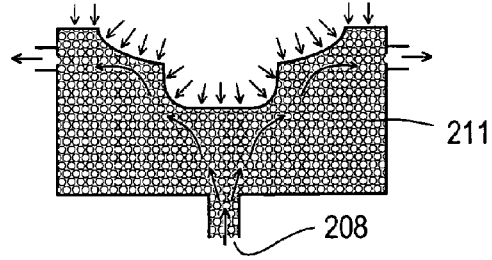
FIG. 12A shows the circulation of liquid within a stabilized mixture in order to effect temperature change of a template or tool.

FIG. 12A shows the liquid portion 208 of a state-change mixture circulating through a stabilized volume 211 of the mixture. This liquid circulation could be usefully used to heat or cool a tool and would be achieved by maintaining a pressure differential between the lower entry port and the upper exit ports. The pressures at these ports would also be kept below ambient so that the upper-surface membrane would continue to be pushed against the bodies and so keep them stabilized, or so that liquid tensile forces would continue to hold the bodies together and the membrane in place.

Figure 12B:
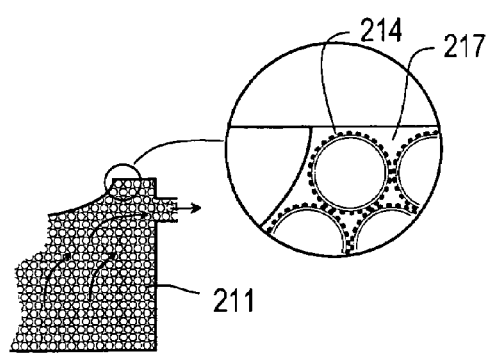
FIG. 12B shows the initial liquid of a mixture being replaced by an immiscible liquid, with a coating of the initial liquid remaining on the bodies.

FIG. 12B shows liquid circulation through a volume 211 as described above. However, additional advantages beyond heating or cooling can be obtained if the initial liquid is driven out of the mixture by an immiscible liquid 217 yet remains as a light adhesive-capable coating 214 on the mixture bodies. For instance if the initial liquid contains a water-soluble adhesive and the immiscible liquid can be heated to a level that drives off enough moisture to lock the bodies together, then the mixture can rapidly taken from a formable state to a consolidated and hardened state. Reintroducing the initial liquid can then dissolve the hardened adhesive and allow the mixture to again become formable.

Figure 12C:
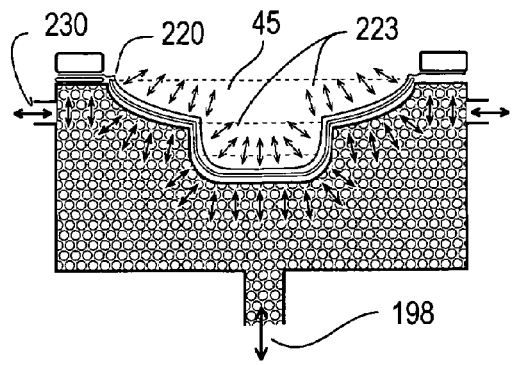
FIG. 12C shows the particles of FIG. 12B, with the immiscible liquid drained off, being conformed and consolidated by sequential pressure differentials.

FIG. 12C shows a varied-pressure method for consolidating the coated particles of 12B without relying on a liquid that completely fills the interstices between the mixture bodies. The method can be applied to any mixture in which the residual liquid furnishes a degree of lubricity between the bodies, and the method may also be applied to dry particulate media including powders as long as the lubricity between surfaces permits relative movement between the bodies or particles without "clumping" as described in U.S. Pat. No. 5,556,169 to Parrish et al., and others. However, the liquid-aided lubricity and the adhesive locking of consolidated bodies as described above gives particular advantage to bodies with a light coating of the appropriate liquid.

The varied-pressure shaping and consolidation process begins with a volume of mixture that would allow pattern part 45 to be pressed into a mixture holding container without any of the mixture being forced out. A membrane cap 220 covers the pattern part and is held with an airtight seal to the container's perimeter. The pattern may or may not have another sealed membrane between itself and the mixture, depending on whether or not the pattern has a mold release or barrier coat or other means to separate it from the mixture at the end of the forming, consolidating and hardening process.

The process begins with air being evacuated between the pattern and the membrane cap while the mixture is at ambient pressure. Air is then extracted from the mixture to allow atmospheric pressure acting on the cap and pattern to compress the mixture against the pattern; however, the extraction proceeds in pulses, with air being added and then cut off through the upper ports 230 as vacuum 195 is also turned on and off. This variation in pressure causes atmospheric pressure 223 against cap 220 to intermittently press on the mixture, thereby periodically relaxing the compression forces on the mixture as it is progressively consolidated. Air pressure above atmospheric could also be periodically applied through the vacuum port to further aid in progressively compressing and relaxing the mixture to allow the bodies to move into a close-packed configuration within the container and against the pattern. After consolidation the mixture can be hardened by an appropriate process such as heating, drying or cooling, depending on the properties of the binding liquid.

FIG. 13A shows a state-change mixture-containing thin membrane envelope 260 with a seal ring 254 around its perimeter. The seal fits the edge of the container in which a male template 257 has been previously formed. The envelope is forced down against the tool by extracting the air that resides between the envelope and the template. The mixture within the envelope is then stabilized to create an inner surface 251 that is a negative replica of the template.

In FIG. 13B there is an additional membrane 263 attached to perimeter ring 254, which in turn is again secured to the perimeter of the lower container. Pressurized air 266 is introduced into the space between this membrane and the mixture-containing membrane envelope, forcing the membrane envelope against the template with greater than atmospheric pressure.

FIGS. 14A and 14B show a flexible, extensible flat envelope portion 269 containing a state-change mixture. Also shown are additional elements that contribute to the envelope's functions as a lightweight tool, mold, or template. A flexible reinforcement element 271 is held in a sleeve 273 that is attached at intervals to the interior of the bottom surface of the envelope. These elements may be composed of bundles of flexible glass or carbon fibers, or of any other material that is in an easily extensible form such as the serpentine configuration shown. Arrays of these reinforcements may be arranged in parallel as shown or may cross each other orthogonally or at other angles. These elements can be wetted by the carrier liquid of the mixture and may also be penetrated by bodies of the mixture so that upon consolidation they are held firmly in place within the mixture and the surrounding envelope. Hardening of the mixture by the various methods described will in effect produce a thin-shell reinforced concrete structure.

Also shown are the cross ties 275 and the support and feed tubes 279 that further contribute to the functions of the envelope. The cross ties serve to hold the opposed surfaces of envelope 269 in relation to one another, thereby preventing an uncontrolled separation of the two surfaces. The ties may be positioned at any interval that effectively controls undesired movement of the state-change mixture within. The mixture may also be contained within a flexible, porous fibrous structure (not shown) such as a light, extensible, non-woven piling mat product that is customarily used for insulation, or may be otherwise held by any arrangement of ties, cellular structures or the like that serve the purpose of preventing the mixture from "slumping" or otherwise shifting within the envelope while in the formable state.

The tubular support elements 279 are connected to and penetrate the underside of envelope 269 and also contain a state-change mixture that may or may not be identical to that in the envelope. They may terminate in a screen element 285 through which the liquid of the mixture passes into and out of the envelope. The liquid can be furnished to the support elements via a manifold (not shown) in base plate 282 to which the tubes are attached, and the liquid may feed through an additional tubular element as will be shown in FIG. 16. The base plate also serves to effectively turn the flat envelope into a stable, self-supporting single-face tool as will be shown in FIG. 16.

FIG. 15 shows a variation of the thin envelope embodiment of FIG. 14. An envelope 289 is closed on itself to create a hollow elongated shape that can serve as a mold insert or as a trapped tool or internal mandrel that can be removed after materials are formed around it. This shape may be pressurized or evacuated by transferring liquids into and out of the hollow center of the construction, and so may be pressed against or collapsed away from the interior of molded or fabricated parts, or against and away from other tools, molds, templates and the like.

In construction this hollow thin-shell structure has the same elements as envelope 269 including flexible reinforcement (not shown), screen elements 285 and support elements 279. However, elements 279 are attached to another tubular feed element 292 that may itself contain state-change materials and so be flexible, or that may be permanently stiff to aid handling and positioning. Element 292 may also contain feed tube 295 that transfers the liquid medium of the state-change mixture into and out of the hollow envelope structure via the support and screen elements as previously described. Tubular element 292 may also incorporate screen elements along its length to facilitate the transfer of liquid into and out of element 292 or the elements 279 into which it would branch.

FIG. 16 shows a single-face tool configuration using the membrane envelope of FIG. 14. Envelope 269 has been impressed with pattern part 305 and consolidated or hardened. Tubular supports 279 have flexed and conformed to the impressed contour and have been likewise consolidated or hardened. As shown the tool configuration has approximately 15% of the volume of an equivalent "tub" type of tool as shown in FIG. 2A through FIG. 6B. As previously described the configuration could be further supported by filling the open volume around the support tubes with additional fill media including the lightweight state-change mixtures as previously described, or otherwise supported through backing the envelope with liquid as disclosed by McCollum. The use of one type of mixture within the envelope, another type within the support elements and yet another type as a broad support medium would be an extension of the concepts described with reference to FIG. 3. The concept of FIG. 16 further integrates those of FIG. 7 and FIG. 13.

Figure 17:
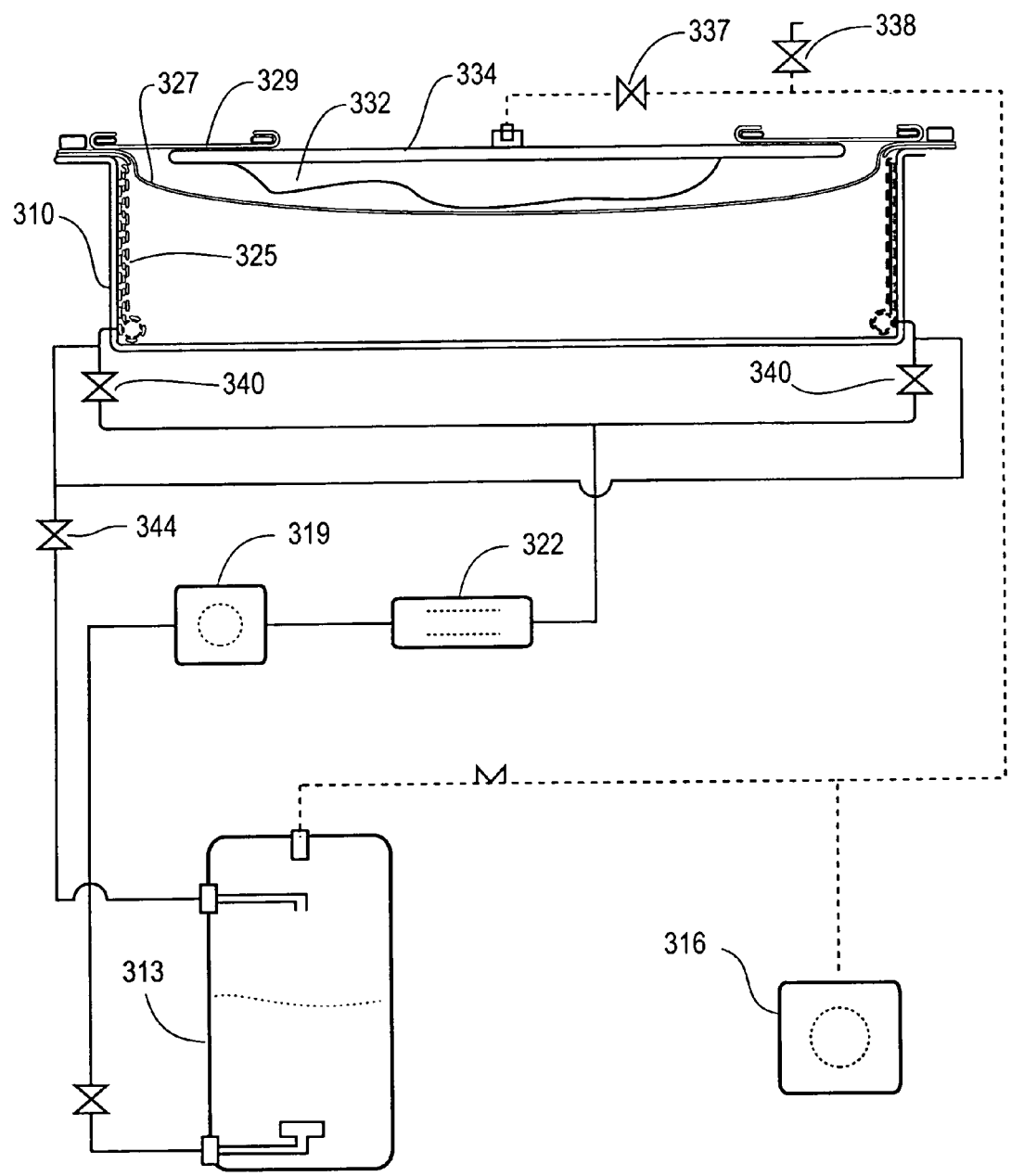
FIG. 17 shows a diagram of a prototype tool-forming system.

Prototype Tool Forming System (FIG. 17)

FIG. 17 is a diagram of an existent prototype tool-forming system that has a "single-face" reformable tool 310, in which the solid bodies of the mixture are held rather than being transported into and out of the tool. The liquid medium is held in a storage tank 313 and is delivered into and extracted from tool 310 by a liquid pump 319. A liquid heater 322 is used to heat the liquid, which in some tests has been water with a water-soluble adhesive that has a temperature-dependent viscosity. Heating the liquid reduces its viscosity and so facilitates flow into the interstices of the solid bodies held in the tool. The heat is also used at a later stage to evaporate water from the residual adhesive clinging to the bodies. Additional components of the system will be noted as the system operating procedure is described.

Tool 310 has a highly elastic surface membrane 327 that overlies the solid bodies and is sealed around the open top of the tool. Screen manifolds 325 have openings too small to pass the bodies and are connected to tank 313 through valves 340 and 344 that are normally closed. Air is initially evacuated from the tool by opening valve 344 and the vacuum system valves through which a vacuum is pulled on the tank by a vacuum pump 316. Since valve 344 is open, air is also removed from the tool, causing the membrane to press against the contained bodies and generally close-pack them if they were not already in this condition from the last operating cycle. The liquid in the tank is being de-aerated by the same vacuum so as remove dissolved gases. De-aerating the tool and the liquid will prevent the forming of voids at a later consolidating stage in which transition liquid is extracted from the tool.

Valve 344 is then closed to hold the tool vacuum, and liquid is introduced to the tool by opening valves 340 and turning on pump 319 and heater 322. Any residual air in the tool will be driven up to membrane 327 and can be removed by stopping the liquid flow (closing valves 340) and reopening valve 344. The valve is then closed and valves 340 opened and the pump again turned on so that liquid continues to be introduced until transition liquid causes the bodies to become mobile beneath the membrane.

A pattern part 332, mounted on a plate 334, is now placed against the membrane. If the plate is not easily pressed down against the membrane so that its smooth edges rest against the membrane, then the elastic vacuum seal 329 is placed so that it seals the plate against the membrane at the tool's rim. Valve 337 is then opened so that air is withdrawn from between the plate and the membrane, causing the membrane to stretch over and follow the contours of the pattern. Since the mixture is in a mobile condition and has no air bubbles that might position themselves against the membrane, as the membrane is drawn against pattern 332 and plate 334 the contained mixture follows the membrane and so completely follows the contours of the pattern. If there are significant concavities on the pattern then talc or some other "vacuum breaking" substance is put on the pattern or the membrane surface so that air will be removed from the concavities.

Plate 332 and seal 329 may be replaced by a flexible, conformable cap such as cap 220 described with reference to FIG. 12C as necessary. If for instance the pattern part is a flexible shell, then the conformable cap would equalize the stresses upon the part exerted by atmospheric pressure as the air is evacuated between surface membrane 327 and the part. Valves 340 are then opened and pump 319 is used to extract the transition liquid, thus consolidating the bodies of the mixture. As this liquid is extracted the membrane, plate and pattern is pressed down against the mixture by atmospheric pressure, assuring that close-packing of the bodies occurs against the membrane surface and so against the pattern.

This consolidation method is effective with a relatively broad range of differing densities between the bodies and the carrier liquid. The concept has been successfully tested with nearly identical densities and with bodies both heavier (nearly twice the density) and lighter (half the density) of the carrier liquid. Sizes of the mixture bodies tested have varied from 10 micron diameter up to 1000 microns, and have included flake-like particles with thicknesses as small as 50 microns and length/width of 100 microns. As long as the bodies do not adhere to one another so as to require vigorous mechanical mixing to disperse, and as long as the bodies when close-packed have some degree of porosity, then both the formability and consolidation steps can be accomplished. Of course there are limitations to the speed of these process steps that are factors of the porosity and the carrier liquid viscosity.

The plate and pattern can now be removed, which action is accomplished by turning off vacuum pump 316 and opening up the atmospheric valve 338, thereby breaking the vacuum between the pattern and the surface membrane. The membrane can now serve as a tool face or further tool hardening step can be taken. In tests of the system, one of the liquids used has been water containing a water-soluble adhesive, though the process described can work similarly with any solvent and soluble-adhesive liquid. The vacuum in the liquid tank can be used to create a pressure differential between the tool and the tank. If the liquid entering the tool has been heated above room temperature and the tank is at room temperature, then sufficient vacuum in the tank will cause a vapor boil-off to begin in the tool. This will in turn drive liquid from the tool under vapor pressure, while at the same time "drying" the adhesive that remains on the bodies.

One method that has been used to boil off sufficient vapor to harden the tool is to apply radiant heat to the membrane, with progressive heating, evaporation and adhesive drying causing the consolidated bodies to be bound together. In addition the vapor has caused liquid to be driven out of the interstices between the bodies so that carrier liquid can be reintroduced into the mass of bodies and so dissolve the adhesive that bonds the bodies together.

Another method that has been used to drive liquid from the interstices of the bodies and to dry the adhesive is to continuously introduce a small quantity of heated air into the tool while maintaining a sufficient vacuum to keep the bodies consolidated and the membrane against the bodies. In addition, a combination of radiant heating, heated air as described and further heating of the tool by external heaters has been used, as well as circulating heated liquid after the consolidation process. Further tests to be performed include heating and hardening through use of an immiscible liquid as previously described. The particular method of liquid draining and bonding of bodies will depend of course on the liquid formulations used and on the physical properties of the bodies as previously described.

The porosity of a hardened tool has also been used to form materials. The membrane was removed and a sheet of thermoplastic was placed over the tool and sealed at the perimeter as was the membrane. The sheet was then heated to the softening point with radiant heat and a vacuum was applied to the tool. The sheet material was stretched and pushed by atmospheric pressure against the tool and then allowed to cool, thereby forming a shape identical to the original pattern part. This is only one of a variety of fabrication and forming operations that can be performed against the single tool or between matching tools as earlier discussed. Additional tests to be performed include the surface coating and sealing method previously described as well as conforming various kinds of release and bondable surface films to the tool

CONCLUSION

While the above is a complete description of specific embodiments of the invention, various modifications, alternative constructions, and equivalents may be used. Therefore, the above description should not be taken as limiting the scope of the invention as defined by the claims.

What is claimed is:

1. A fabrication method comprising:
providing a plurality of solid bodies;
surrounding the plurality of solid bodies with a volume of carrier liquid, the volume of carrier liquid being sufficient to coat the bodies and fill interstices between the bodies;
removing at least some of the carrier liquid that occupies the interstices so that the bodies become substantially close-packed solid bodies having a coating of the carrier liquid thereon, the coating being sufficiently thin that the bodies have interstices therebetween devoid of liquid, the coating being a state-changeable coating having an adhesive state and a non-adhesive state; and
causing the state-change coating to change from the non-adhesive state to the adhesive state so as to result in a solidified porous volume.

2. The method of claim 1 wherein the solid bodies are hollow.

3. The method of claim 1 wherein the bodies are of substantially the same density throughout their respective volumes.

4. The method of claim 1 wherein:
the carrier liquid includes a solvent and an adhesive material, the solvent being sufficient such that the adhesive material does not exhibit its adhesive property; and
causing the state-change coating to change from the non-adhesive state to the adhesive state includes removing a sufficient amount of solvent so that adhesive material left on the surface of the solid bodies defines the state-change coating and exhibits its adhesive property.

5. The method of claim 1 wherein:
the carrier liquid is a material above its melting temperature; and
causing the state-change coating to change from the non-adhesive state to the adhesive state includes lowering the temperature of the material below its melting temperature.

6. The method of claim 5 wherein the material is a eutectic alloy.

7. The method of claim 5 wherein the material is a paraffin.

8. A fabrication method comprising:
providing a plurality of substantially close-packed solid bodies, the bodies having a state-changeable non-metallic coating, the state-changeable coating having an adhesive state and a non-adhesive state, the state-changeable coating being sufficiently thin that the substantially closed-packed bodies have interstices therebetween; and
causing the state-change coating to change from the non-adhesive state to the adhesive state so as to result in a solidified porous volume.

9. The method of claim 8 wherein the solid bodies are hollow.

10. The method of claim 8 wherein the bodies are of substantially the same density throughout their respective volumes.

11. The method of claim 8 wherein said providing the bodies comprises:
surrounding the plurality of solid bodies with a volume of carrier liquid, the volume of carrier liquid being sufficient to coat the bodies and fill the interstices between the bodies; and
removing at least some of the carrier liquid that occupies the interstices to leave the coating on the bodies with the interstices devoid of liquid.

12. The method of claim 11 wherein:
the carrier liquid includes a solvent and an adhesive material, the solvent being sufficient such that the adhesive material does not exhibit its adhesive property; and
causing the state-change coating to change from the non-adhesive state to the adhesive state includes removing a sufficient amount of solvent so that adhesive material left on the surface of the solid bodies defines the state-change coating and exhibits its adhesive property.

13. The method of claim 12 wherein:
the carrier liquid is a material above its melting temperature; and
causing the state-change coating to change from the non-adhesive state to the adhesive state includes lowering the temperature of the material below its melting temperature.

14. The method of claim 13 wherein the material is a paraffin.

15. A fabrication method comprising:
providing a plurality of substantially close-packed solid bodies, the bodies having a state-changeable non-metallic coating, the state-changeable coating having an adhesive state and a non-adhesive state, the state-changeable coating being sufficiently thin that the substantially closed-packed bodies have interstices therebetween;
causing the state-change coating to change from the non-adhesive state to the adhesive state so as to result in a solidified porous volume; and
thereafter, causing at least a portion of the state-change coating to change from the adhesive state to the non-adhesive state so as to allow at least a portion of the solid bodies to provide a volume in a formable state.

16. The method of claim 15 wherein the solid bodies are hollow.

17. The method of claim 15 wherein the bodies are of substantially the same density throughout their respective volumes.

18. The method of claim 15 wherein said providing the bodies comprises:
surrounding the plurality of solid bodies with a volume of carrier liquid, the volume of carrier liquid being sufficient to coat the bodies and fill the interstices between the bodies; and
removing at least some of the carrier liquid that occupies the interstices to leave the coating on the bodies with the interstices devoid of liquid.

19. The method of claim 18 wherein:
the carrier liquid includes a solvent and an adhesive material, the solvent being sufficient such that the adhesive material does not exhibit its adhesive property; and
causing the state-change coating to change from the non-adhesive state to the adhesive state includes removing a sufficient amount of solvent so that adhesive material left on the surface of the solid bodies defines the state-change coating and exhibits its adhesive property.

20. The method of claim 19 wherein:
the carrier liquid is a material above its melting temperature; and
causing the state-change coating to change from the non-adhesive state to the adhesive state includes lowering the temperature of the material below its melting temperature.

* * * * *